United States Patent
Ma

(10) Patent No.: US 12,338,902 B2
(45) Date of Patent: Jun. 24, 2025

(54) MULTI-WAY VALVE, WATER SOFTENER, AND METHOD FOR CONTROLLING WATER SOFTENER

(71) Applicant: NANJING FOBRITE ENVIRONMENTAL TECHNOLOGY CO., LTD, Jiangsu (CN)

(72) Inventor: Xuguang Ma, Jiangsu (CN)

(73) Assignee: NANJING FOBRITE ENVIRONMENTAL TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/261,105

(22) PCT Filed: Mar. 2, 2022

(86) PCT No.: PCT/CN2022/078834
§ 371 (c)(1),
(2) Date: Jul. 11, 2023

(87) PCT Pub. No.: WO2023/155246
PCT Pub. Date: Aug. 24, 2023

(65) Prior Publication Data
US 2024/0159322 A1    May 16, 2024

(30) Foreign Application Priority Data
Feb. 21, 2022    (CN) .......................... 202210158144.4

(51) Int. Cl.
*F16K 11/22* (2006.01)
*F16K 11/07* (2006.01)
(Continued)

(52) U.S. Cl.
CPC .......... *F16K 11/22* (2013.01); *F16K 11/0716* (2013.01); *F16K 31/046* (2013.01);
(Continued)

(58) Field of Classification Search
None
See application file for complete search history.

(56) References Cited

U.S. PATENT DOCUMENTS 5,157,979 A * 10/1992 Brane .................... B01J 49/75
74/567
6,402,944 B1 * 6/2002 Vaughan ................ F16J 15/102
137/625.69
(Continued)

FOREIGN PATENT DOCUMENTS

| CN | 103277541 A | 9/2013 |
| CN | 104061345 A | 9/2014 |

(Continued)

OTHER PUBLICATIONS

International Search Report issued in PCT/CN2022/078834, mailed on Mar. 2, 2022.
(Continued)

*Primary Examiner* — Matthew W Jellett
(74) *Attorney, Agent, or Firm* — HSML P. C.

(57) ABSTRACT

A multi-way valve, a water softener, and a method for controlling the water softener. The multi-way valve is provided with a main valve and a secondary valve. When each of the main valve and the secondary valve is at a bypass valve position, a water inlet passage, a first main valve passage, a first secondary valve passage, a second secondary valve passage, a second main valve passage, and a water outlet passage of the multi-way valve are sequentially connected, thereby forming a bypass flow path in the multi-way valve.

17 Claims, 16 Drawing Sheets

(51) Int. Cl.
*F16K 31/04* (2006.01)
*F16K 31/163* (2006.01)
*F16K 31/383* (2006.01)
*F16K 37/00* (2006.01)
*F16K 31/50* (2006.01)
*F16K 31/53* (2006.01)

(52) U.S. Cl.
CPC .......... *F16K 31/163* (2013.01); *F16K 31/383* (2013.01); *F16K 37/0041* (2013.01); *F16K 31/50* (2013.01); *F16K 31/53* (2013.01); *F16K 2200/50* (2021.08)

(56) References Cited

U.S. PATENT DOCUMENTS

| | | | | |
|---|---|---|---|---|
| 6,444,127 | B1* | 9/2002 | Vaughan | F16K 31/046 137/554 |
| 6,644,349 | B2* | 11/2003 | Scanlan | F16K 31/52483 210/426 |
| 7,008,530 | B2* | 3/2006 | Stocchiero | B01J 49/75 210/191 |
| 8,328,162 | B2* | 12/2012 | Prescott | C02F 1/42 251/290 |
| 10,479,699 | B1 | 11/2019 | Chandler, Jr. et al. | |
| 2007/0144953 | A1 | 6/2007 | Rivi | |
| 2015/0192210 | A1* | 7/2015 | Averbeck | C02F 1/469 137/625.67 |

FOREIGN PATENT DOCUMENTS

| | | |
|---|---|---|
| CN | 204901949 U | 12/2015 |
| CN | 108916149 A | 11/2018 |
| CN | 109133266 A | 1/2019 |
| CN | 110220012 A | 9/2019 |
| CN | 111503323 A | 8/2020 |
| CN | 112943976 A | 6/2021 |
| CN | 113149246 A | 7/2021 |
| EP | 4067313 A1 | 10/2022 |
| JP | 5369932 B2 | 12/2013 |
| WO | 2019222420 A1 | 11/2019 |

OTHER PUBLICATIONS

Written Opinion issued in PCT/CN2022/078834, mailed on Mar. 2, 2022.

The extended European Search Report issued in corresponding European Patent Application No. 22919277.8, dated Jun. 26, 2024.

Chinese Office Action issued in corresponding Chinese Patent Application No. 202210158144.4 dated Sep. 22, 2022, pp. 1-6.

Chinese Notice of Allowance issued in corresponding Chinese Patent Application No. 202210158144.4 dated Oct. 25, 2022, pp. 1-3.

* cited by examiner (a)

(b)

(c)

(d)

MULTI-WAY VALVE, WATER SOFTENER, AND METHOD FOR CONTROLLING WATER SOFTENER

CROSS REFERENCE TO RELATED APPLICATIONS

This application is a US national phase application based upon an International Application No. PCT/CN2022/078834, filed on Mar. 2, 2022, which claims priority to and the benefit of Chinese Patent Application No. 202210158144.4, filed on Feb. 21, 2022. The disclosures of the aforementioned applications are incorporated herein by reference in their entireties.

TECHNICAL FIELD

The present application belongs to water softening processing technologies, and particularly relates to a multi-way valve, a water softener, and a method for controlling the water softener.

BACKGROUND

A water softener is a water processing device that removes calcium and magnesium ions from water and reduces water hardness. At present, an integrated water softener in the market is mainly a single-tank water softener. When exchange resin in a resin tank loses efficacy, water hardness reaches an upper limit value. The resin in the resin tank needs to be regenerated, and then soft water is generated again. Due to single-tank water supply, during resin regeneration, the water softener cannot provide softened water, resulting in this kind of device not meeting a usage requirement of an uninterrupted water supply. Multi-tank water softeners emerge as the times require. However, compared to the single-tank water softener, the multi-tank water softener has a complicated structure, cumbersome control operation, a high price, and a large volume, which cannot satisfy a use requirement in a restricted site. Therefore, a two-tank water softener, which has a relatively simple structure and two resin cans, of which one is in a working state and the other is in a standby state, is a development trend.

The current double-tank water softener generally realizes functions such as switching of a working tank and a standby tank and regeneration through a multi-way valve. Due to structural limitation of an existing multi-way valve, in practical use, the functions realized by the double-tank water softener are limited. For example, to satisfy a scenario (e.g., watering flowers, washing cars) without the need for soft water, most two-tank water softeners need to be installed with an additional bypass valve during installation. In this way, when meeting the above scenario, the water softener is closed, and a water inlet and a water outlet of the water softener are connected through the bypass valve, thereby achieving a direct supply of hard water through the bypass valve. Generally, the bypass valve is installed at a rear of the water softener, which is difficult to operate and unfavourable to use. Also, it is obvious that the more devices installed on a water supply pipe, the higher usage cost of a user is, and the greater a water leakage risk is, which is detrimental to use safety.

The present application provides a multi-way valve, which is intended to overcome drawbacks of a multi-way valve in the prior art that the multi-way valve requires to be additionally installed with an external bypass valve to realize a bypass function. The present application further provides a water softener having the above-mentioned multi-way valve and a method for controlling the water softener so as to improve use convenience of a two-tank water softener for continuous water supply.

SUMMARY

An embodiment of the present application discloses a multi-way valve including a main valve and a secondary valve. The main valve includes:
a main valve body including a first inner chamber, wherein the main valve body is provided with main valve passages connected to the first inner chamber, the main valve passages including a water inlet passage, a water outlet passage, a first main valve passage, and a second main valve passage; and
a main valve core provided in the first inner chamber, wherein the main valve core moves in the first inner chamber to open or close passages between the main valve passages to realize a valve position switch of the main valve;
wherein the secondary valve includes:
a secondary valve body including a second inner chamber, wherein the secondary valve body is provided with secondary valve passages connected to the second inner chamber, the secondary valve passage includes a first secondary valve passage connected to the first main valve passage and a second secondary valve passage connected to the second main valve passage; and
a secondary valve core provided in the second inner chamber, the secondary valve core moving in the second inner chamber to open or close passages between the secondary valve passages to realize a valve position switch of the secondary valve;
wherein each of the main valve and the secondary valve includes a bypass valve position, when each of the main valve and the secondary valve is at the bypass valve position, the water inlet passage, the first main valve passage, the first secondary valve passage, the second secondary valve passage, the second main valve passage, and the water outlet passage are sequentially connected.

In some embodiments, the main valve includes a first valve position, and the main valve passages include a third main valve passage and a fourth main valve passage, wherein when the main valve is at the first valve position, the water inlet passage is connected to the third main valve passage, and the water outlet passage is connected to the fourth main valve passage and the second main valve passage.

In some embodiments, the main valve includes a second valve position, and the main valve passages include a fifth main valve passage and a sixth main valve passage, wherein when the main valve is at the second valve position, the water inlet passage is connected to the fifth main valve passage, the water outlet passage is connected to the sixth main valve passage and the second main valve passage, and the first main valve passage is connected to the third main valve passage.

In some embodiments, the main valve passages include a seventh main valve passage, wherein when the main valve is at the first valve position, the sixth main valve passage is connected to the seventh main valve passage.

In some embodiments, the main valve core includes a first main valve core passage, wherein when the main valve core is at the first valve position, the first main valve passage is connected to the fifth main valve passage through the first main valve core passage.

In some embodiments, the main valve core includes a second main valve core passage, wherein when the main valve is at the second valve position, the fourth main valve passage is connected to the seventh main valve passage through the second main valve core passage.

In some embodiments, the secondary valve includes a third valve position, the secondary valve passage includes a third secondary valve passage and a fourth secondary valve passage, and the third secondary valve passage is connected to the seventh main valve passage; wherein when the secondary valve is at the third valve position, the third secondary valve passage is connected to the fourth secondary valve passage.

In some embodiments, the secondary valve includes a fourth valve position, the secondary valve passage includes a fifth secondary valve passage, a jet is provided in the secondary valve body, and a nozzle of the jet is connected to the third secondary valve passage; wherein when the secondary valve is at the fourth valve position, the first secondary valve passage is connected to the fifth secondary valve passage, and the fourth secondary valve passage is connected to an inlet of the jet.

In some embodiments, the secondary valve includes a fifth valve position, wherein when the secondary valve is at the fifth valve position, the first secondary valve passage is connected to the fifth secondary valve passage, and the second secondary valve passage is connected to the third secondary valve passage.

In some embodiments, the secondary valve includes a sixth valve position and the secondary valve core includes a secondary valve core passage; wherein when the secondary valve is at the sixth valve position, the first secondary valve passage is connected to the second secondary valve passage, and the third secondary valve passage is connected to the fifth secondary valve passage through the secondary valve core passage.

In some embodiments, the secondary valve includes a closing valve position, wherein when the secondary valve is at the closing valve position, the passages between the secondary valve passages are closed.

In some embodiments, the main valve further includes a main valve driving device connected to the main valve body and configured to drive the main valve core to move in the first inner chamber; and
the secondary valve further includes a secondary valve driving device connected to the secondary valve and configured to drive the secondary valve core to move in the second inner chamber.

In some embodiments, each of the main valve body and the secondary valve body includes grilles, each of the main valve passages and the secondary valve passage is between adjacent grilles, and each of the main valve core and the secondary valve core includes water-passing grooves; a valve position switch of the main valve and the secondary valve is achieved through corresponding matching of the water-pass grooves and the grilles.

Accordingly, an embodiment of the present application discloses a water softener including a first resin tank, a second resin tank, a control unit, and the multi-way valve as described herein. A resin chamber of the first resin tank is connected to the third main valve passage of the multi-way valve, and a central pipe of the first resin tank is connected to the fourth main valve passage of the multi-way valve. A resin chamber of the second resin tank is connected to the fifth main valve passage of the multi-way valve, and a central pipe of the second resin tank is connected to the sixth main valve passage of the multi-way valve. The control unit controls a valve position switch of the multi-way valve.

In some embodiments, the water softener includes:
a flow quantity detection device provided on the multi-way valve and configured to detect cumulative flow quantity of soft water of the first resin tank and the second resin tank;
wherein the control unit receives a flow quantity signal of the flow quantity detection device, and controls the valve position switch of the multi-way valve according to the flow quantity signal to change working states of the first resin tank and/or the second resin tank.

In some embodiments, the water softener includes:
a salt tank inside which the first resin tank, the second resin tank, and the multi-way valve are provided; and
a salt level detection device provided inside the salt tank and configured to detect a salt level in the salt tank;
wherein the control unit receives a salt level signal of the salt level detection device and issues an alarm when the salt level is lower than a threshold value.

In some embodiments, the water softener includes:
a water leakage alarm device connected to the control unit, wherein the water leakage alarm device transmits a water leakage signal to the control unit when the water leakage alarm device detects water leakage, and the control unit controls the multi-way valve to close.

In some embodiments, the water softener includes:
a water mixing device connected between the water inlet passage and the water outlet passage, the water mixing device being controlled by the control unit.

Accordingly, an embodiment of the present application discloses a method for controlling the water softener as described above, including:
taking the first resin tank as a working tank and taking the second resin tank as a standby tank, or taking the first resin tank as the standby tank and taking the second resin tank as the working tank; and comparing cumulative flow quantity of soft water of the working tank and a preset value, and when the cumulative flow quantity of soft water reaches the preset value, controlling the multi-way valve to switch the working tank and the standby tank.

In some embodiments, the method for controlling the water softener includes: making the main valve and the secondary valve enter a bypass state through controlling the multi-way valve, and supplying water that has not been softened through the water softener.

BRIEF DESCRIPTION OF THE DRAWINGS

Technical solutions and other beneficial effects of the present application will be apparent from the detailed description of specific implementation ways of the present application in conjunction with the accompanying drawings hereinafter.

Figure 1:
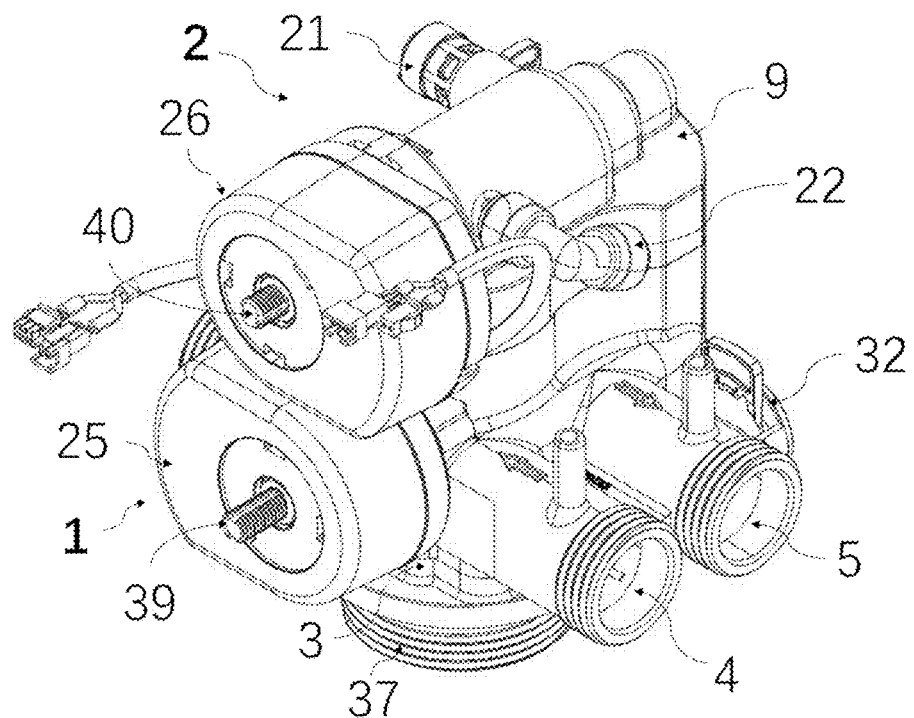
FIG. 1 is a diagram of a three-dimensional structure of a multi-way valve provided by some embodiments of the present application.
Figure 2:
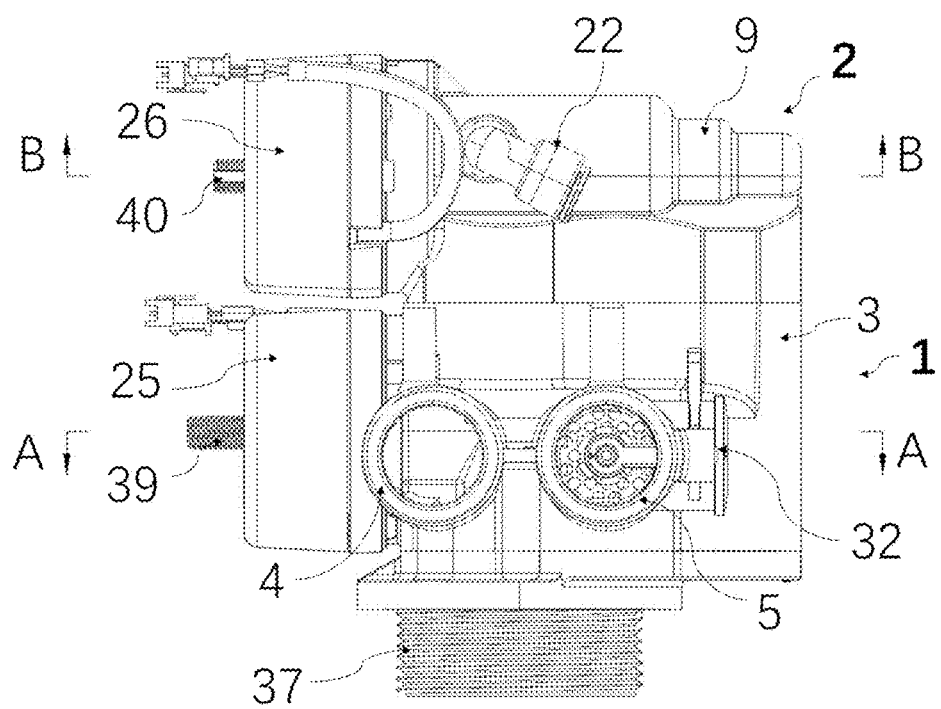
FIG. 2 is a front view of the multi-way valve provided by some embodiments of the present application.
Figure 3:
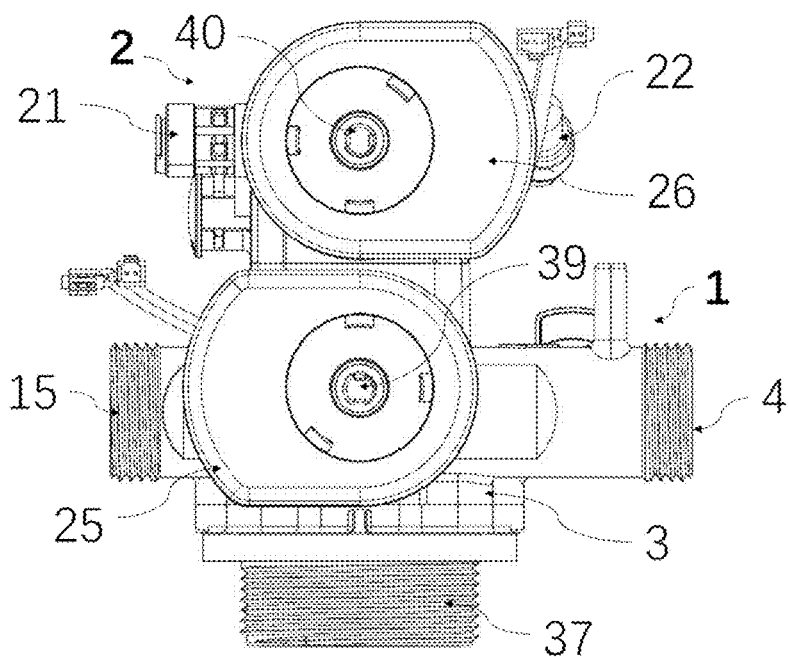
FIG. 3 is a left view of the multi-way valve in FIG. 2.
Figure 4:
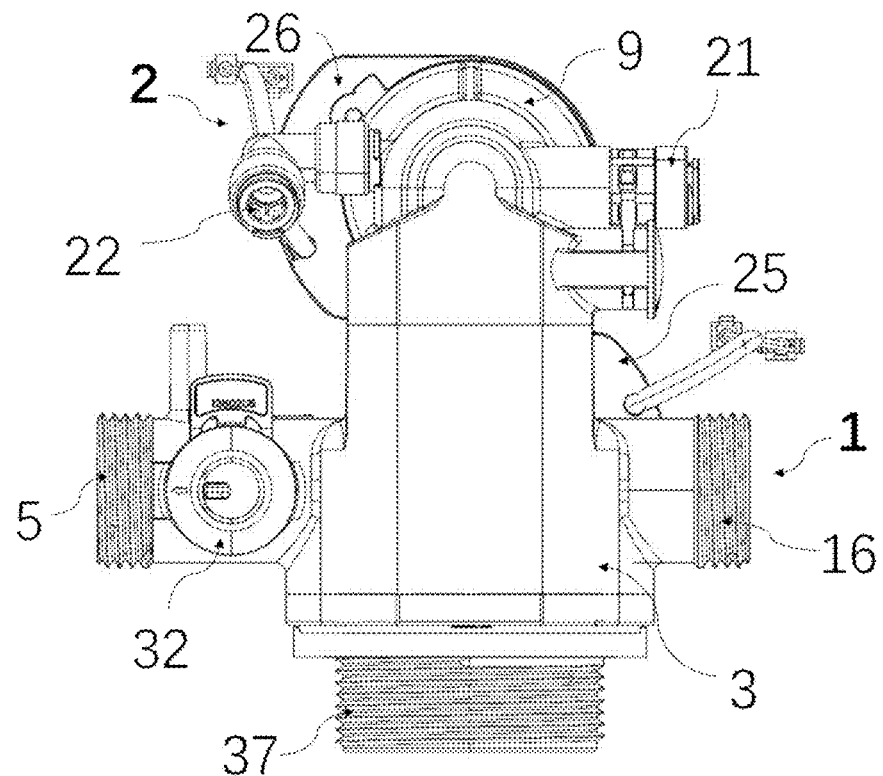
FIG. 4 is a right view of the multi-way valve in FIG. 2.
Figure 5:
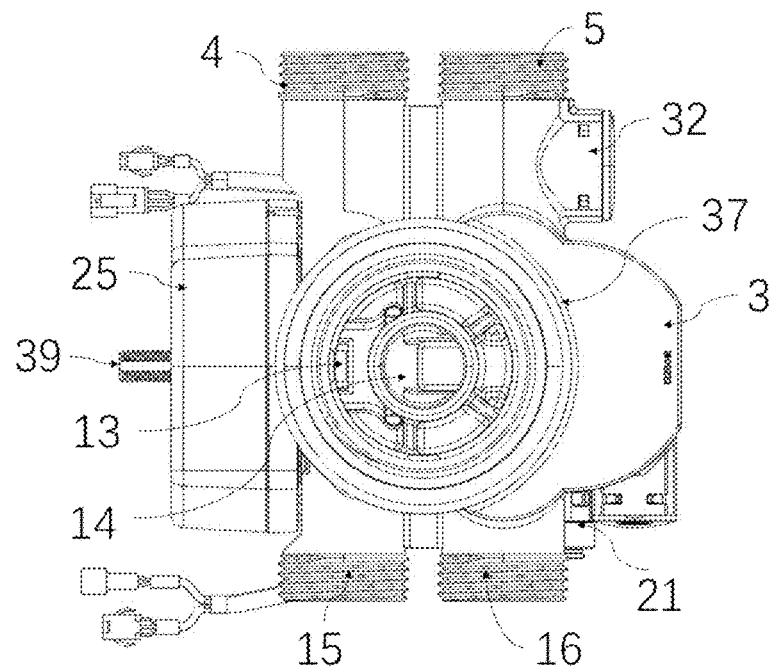
FIG. 5 is a bottom view of the multi-way valve in FIG. 2.
Figure 6:
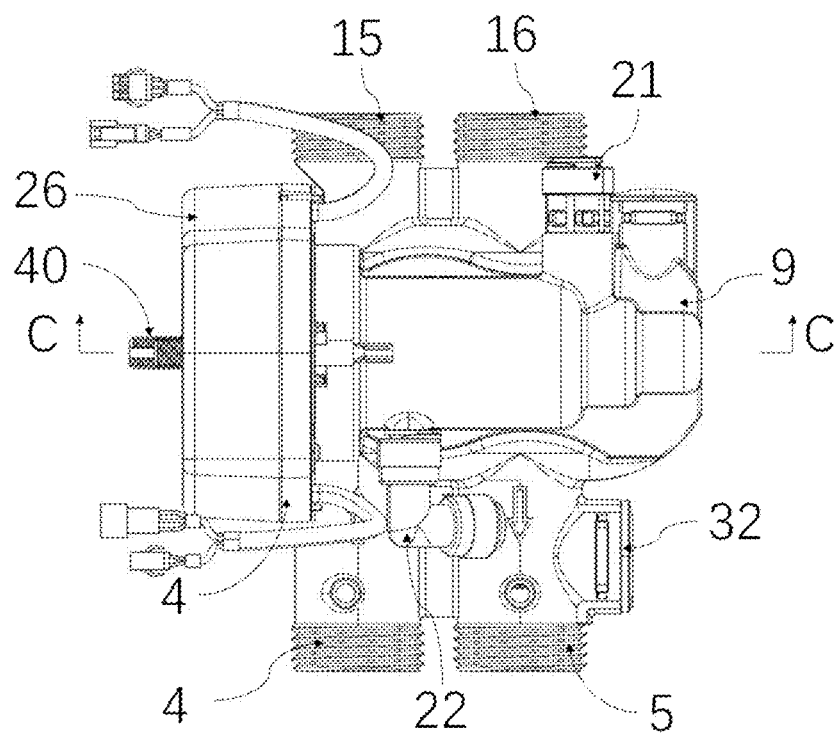
FIG. 6 is a top view of the multi-way valve in FIG. 2.

Reference numeral: 1—main valve; 2—secondary valve; 3—main valve body; 4—water inlet passage; 5—water outlet passage; 6—first main valve passage; 7—second main valve passage; 8—main valve core; 9—secondary valve body; 10—first secondary valve passage; 11—second secondary valve passage; 12—secondary valve core; 13—third main valve passage; 14—fourth main valve passage; 15—fifth main valve passage; 16—sixth main valve passage; 17—seventh main valve passage; 18—first main valve core passage; 19—second main valve core passage; 20—third secondary valve passage; 21—fourth secondary valve passage; 22—fifth secondary valve passage; 23—jet; 24—secondary valve core passage; 25—main valve driving device; 26—secondary valve driving device; 27—grille; 28—water-passing groove; 29—first resin tank; 30—second resin tank; 31—control unit; 32—flow quantity detection device; 33—salt tank; 34—salt level detection device; 35—water leakage alarm device; 36—water mixing device; 37—first connection port; 38—second connection port; 39—first driving rod; 40—second driving rod; 41—piston part; 42—driving motor; 43—reduction gear set; 44—driving gear; 45—grating sensor; 46—cover; 47—resin chamber; and 48—central pipe.

DETAILED DESCRIPTION

Technical solutions in embodiments of the present application will be described clearly and completely in connection with accompanying drawings of the present application hereinafter. It is apparent that the described embodiments are only part of embodiments of the present application, and not all embodiments thereof.

Based on the embodiments in the present application, all other embodiments obtained by a person having skill in the art without any inventive effort fall within the protection scope of the present application. In the present application, it should be understood that orientations or position relationships indicated by the terms "on", "under", "left", "right", "top", "bottom", "inside", "outside", or the like are based on orientations or position relationships shown in the drawings. These terms are merely intended to better describe the present application and simplify description, and not to indicate or suggest that an indicated device or component must be in a particular orientation or be constructed or operated in a particular orientation, which thus cannot be construed as limitation of the present application. Furthermore, the terms "first", "second", "third", "fourth", "fifth", "sixth", "seventh" are used for descriptive purposes only and are not to be construed as indicating or suggesting relative importance or implying a number of indicated technical features. In the description of this application, "plurality" means two or more, unless expressly and specifically defined otherwise.

In the description of the present application, it is to be noted that the terms "connection" and "joining" should be understood in a broad sense unless explicitly specified or defined otherwise. For example, these terms may be a fixed connection, a detachable connection, or an integrated connection; may be a mechanical connection, an electrical connection, or intercommunication; may be a direct connection, an indirect connection through an intermediate medium, an internal communication of two elements, or an interaction of two elements. A person having ordinary skill in the art may understand specific meanings of these terms in the present application may be understood by according to specific circumstances.

An embodiment of the present application discloses a multi-way valve, which is mainly applied to a two-tank water softener for continuous water supply, and is configured to control the water softener to realize switching of various working states, thereby meeting use requirements of a user.

As shown in FIG. 1 to FIG. 6, in some embodiments, the multi-way valve includes a main valve 1 and a secondary valve 2 which are integrally connected. The main valve 1 and the secondary valve 2 may be integrally connected in a part-to-part assembly manner, which can be arranged up and down, left and right, or obliquely. In some embodiments, the multi-way valve may be in a separable structure. The main valve 1 and the secondary valve 2 may be provided as two separate parts, which are connected by piping. In a specific implementation, a person skilled in the art can select the structure of the multi-way valve according to manufacturing conditions and assembly space of the multi-way valve in the water softener.

Figure 7:
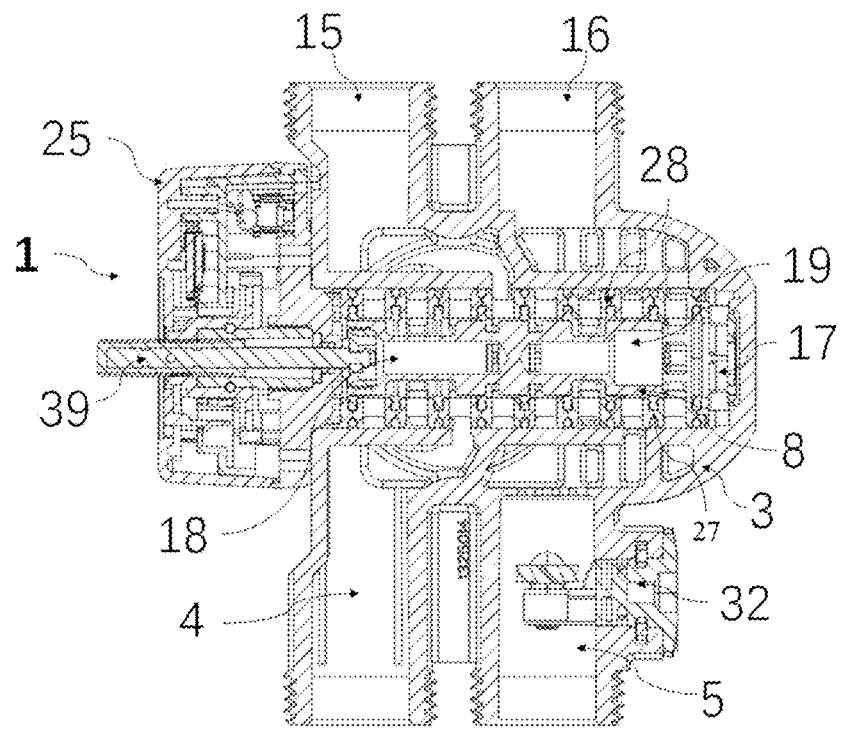
FIG. 7 is a sectional view of the multi-way valve along an A-A line in FIG. 2.
Figure 9:
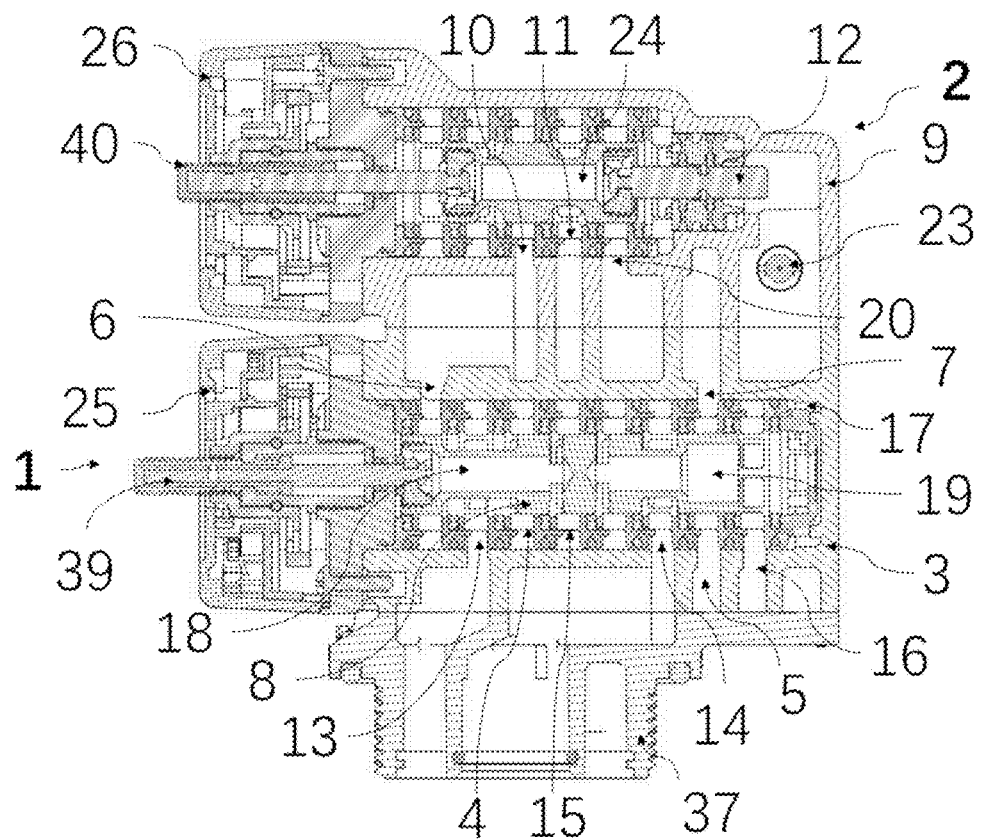
FIG. 9 is a sectional view of the multi-way valve along a C-C line in FIG. 6.

Referring to FIG. 7 and FIG. 9, in some embodiments, the main valve 1 mainly includes a main valve body 3, a main valve core 8, and a main valve driving device 25. The main valve body 3 may be a one-piece structure that are integrally formed, or may be formed by producing components of various parts and assembling the components. The main valve core 8 is movably provided inside the main valve body 3. The main valve driving device 25 is mounted on one side of the main valve body 3, is connected to the main valve core 8, and drives the main valve core 8 to move in the main valve body 3.

The main valve body 3 has a first inner chamber and a plurality of main valve passages connected to the first inner chamber. The first inner chamber is substantially cylindrical. In some embodiments, the first chamber has a smooth side wall surface, and the main valve passages open at different locations on the side wall surface of the first inner chamber. The main valve core 8 is provided inside the first inner chamber, and a piston part 41 of the main valve core 8 fit closely to the side wall surface of the first inner chamber to achieve seal. The main valve driving device 25 provides an external force to enable the main valve core 8 to move between different positions in the first inner chamber to selectively open or close passages between the main valve passages, thereby achieving valve position switch of the main valve 1.

Figure 10:
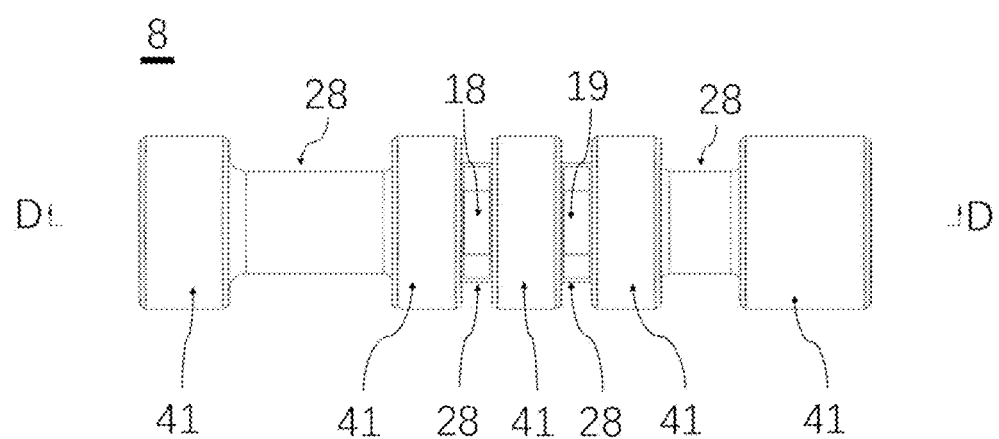
FIG. 10 is a schematic structural diagram of a main valve core of the multi-way valve provided by some embodiments of the present application.

In combination with FIG. 10, for the main valve core 8, a portion with a larger diameter is the piston part 41, which is configured to achieve seal. A part between two adjacent piston parts 41 is concaved to form a water-passing groove 28. When the main valve core 8 is moved to a certain position in the first inner chamber, and openings of the plurality of main valve passages on an inner wall of the first inner chamber are crossed by a same water-passing groove 28, the crossed main valve passages may be connected to each other through the water-passing groove 28. It will be appreciated that an axial span of each piston part 41 and an axial span of each water-passing groove 28 can be rationally designed by taking into account an axial length of the main valve core 8, axial space in which the main valve core 8 may move in the first inner chamber, opening positions of the main valve passages in the first inner chamber, valve position conditions set for the main valve 1, and the like. Accordingly, the opening positions of the main valve passages can also be rationally designed by taking into account the axial length of the main valve core 8, the axial space in which the main valve core 8 may move in the first inner chamber, the axial span of each piston part 41, the axial span of each water-passing groove 28, the valve position conditions set for the main valve 1, and the like.

Figure 11:
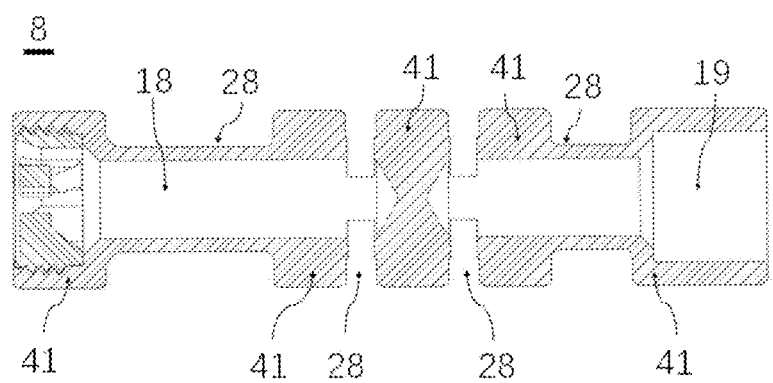
FIG. 11 is a sectional view of the main valve core along a D-D line in FIG. 10.

In combination with FIG. 11, in some embodiments, the main valve core 8 is further provided with a main valve core passage which extends inside the main valve core 8 and forms two openings on the main valve core 8. By designing specific positions of the two openings, the plurality of main valve passages that are not on a span of a same water-passing groove 28 through the main valve core passage are connected to each other through the main valve core passage. A specific number of the main valve core passages and the opening positions may be set according to requirements of specific implementation. For example, in some embodiments, the main valve core 8 is provided with one main valve core passage, a first main valve core passage 18. The first main valve core passage 18 extends towards the inside of the main valve core 8 from one end of the main valve core 8 and is open in a middle region of the main valve core 8 and is connected to a water-passing groove 28. In some embodiments, in addition to the first main valve core passage 18, the main valve core 8 is further provided with a second main valve core passage 19. The second main valve core passage 19 is provided opposite the first main valve core passage 18, extends towards the inside of the main valve core 8 from the other end of the main valve core 8, and is also open in the middle region of the main valve core 8 and is connected to another water-passing groove 28. The first main valve core passage 18 and the second main valve core passage 19 are blocked by the piston part 41 located therebetween.

Please refer to FIG. 7 and FIG. 9 again, in some embodiments, the main valve body 3 further includes a plurality of grilles 27 spaced apart in the first inner chamber. The grilles 27 are in an annular shape. Both inner rings and outer rings of the grilles 27 are provided with sealing elements, the outer rings cooperating with the side wall surface of the first inner chamber to form a seal. The opening of each main valve passage is located between two adjacent grilles 27. In this embodiment, the main valve core 8 is no longer in contact with the side wall surface of the first inner chamber, but passes through the inner ring of each grille 27, the inner ring of the grille 27 cooperating with the piston part 41 to form a seal. When a certain water-passing groove 28 crosses several grilles 27, the main valve passages located on two sides of each of the crossed grilles 27 may be connected through the water-passing groove 28.

It will be appreciated that a number of the main valve passages is set according to a use requirement of a water softener to which the main valve passages are applied. In order to meet various requirements of the two-tank water softener for continuous water supply and to achieve an in-valve bypass function, please refer to FIG. 1 to FIG. 7 and FIG. 9 again, in some embodiments, the plurality of main valve passages provided on the main valve body 3 includes a water inlet passage 4, a water outlet passage 5, a first main valve passage 6, a second main valve passage 7, a third main valve passage 13, a fourth main valve passage 14, a fifth main valve passage 15, a sixth main valve passage 16, and a seventh main valve passage 17. The water inlet passage 4 is configured to connect to a water inlet pipe to introduce hard water to be treated, and the water outlet passage 5 is configured to connect to a water supply pipe of a user to supply water. The first main valve passage 6, the second main valve passage 7, and the seventh main valve passage 17 are respectively connected to corresponding secondary valve passages. The third main valve passage 13 and the fourth main valve passage 14 are configured to connect to one resin tank of the two-tank water softener for continuous water supply, and the fifth main valve passage 15 and the sixth main valve passage 16—are configured to connect the other resin tank of the two-tank water softener for continuous water supply.

Figure 8:
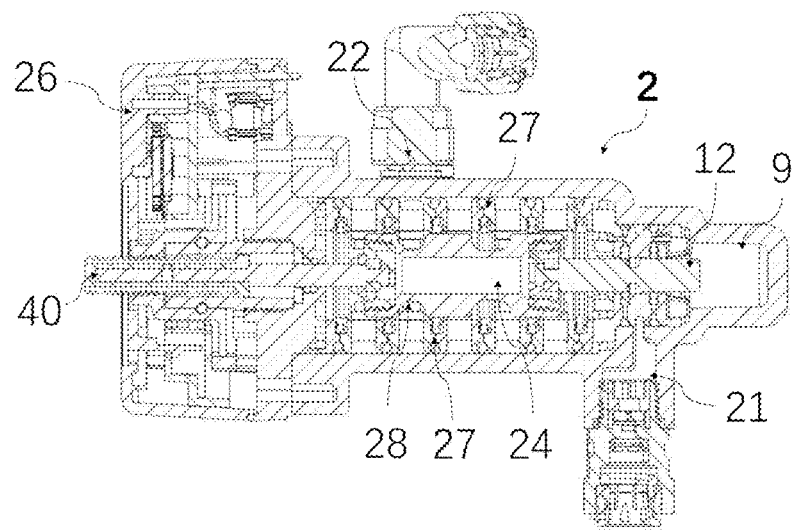
FIG. 8 is a sectional view of the multi-way valve along a B-B line in FIG. 2.

Please refer to FIG. 8 and FIG. 9, in some embodiments, the secondary valve 2 mainly includes the secondary valve body 9, a secondary valve core 12, and a secondary valve driving device 26. Similar to the main valve body 3, the secondary valve body 9 may be a one-piece structure that is integrally formed, or may be formed by producing components of various parts and assembling the components. The secondary valve core 12 is movably provided inside the secondary valve body 9. The secondary valve driving device 26 is mounted on one side of the secondary valve body 9, is connected to the secondary valve core 12, and drives the secondary valve core 12 to move in the secondary valve body 9.

The secondary valve body 9 has a second inner chamber and a plurality of secondary valve passages connected to the second inner chamber. In some embodiments, the second chamber has a smooth side wall surface, and the secondary valve passages open at different locations on the side wall surface of the second inner chamber. The secondary valve core 12 is provided inside the second inner chamber, and a piston part 41 of the secondary valve core 12 fit closely to the side wall surface of the second inner chamber to achieve seal. The secondary valve driving device 26 provides an external force to enable the secondary valve core 12 to move between different positions in the second inner chamber to selectively open or close passages between the secondary valve passages, thereby achieving valve position switch of the secondary valve 2.

Figure 12:
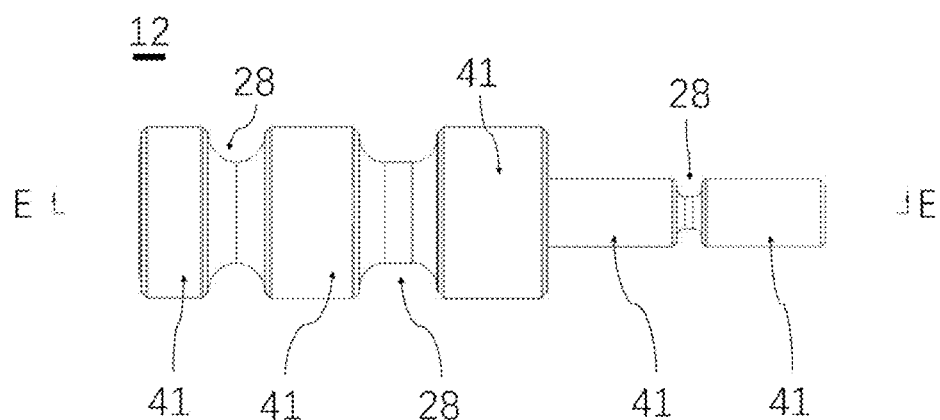
FIG. 12 is a schematic structural diagram of a secondary valve core of the multi-way valve provided by some embodiments of the present application.

In connection with FIG. 12, in some embodiments, the secondary valve core 12 is a two-section structure with two connected sections. In each section of the two-section structure, a part with a larger diameter is the piston part 41, and a part between two adjacent piston parts 41 is concaved to form the water-passing groove 28. When the secondary valve core 12 is moved to a certain position in the second inner chamber, and openings of the plurality of secondary valve passages on an inner wall of the second inner chamber are crossed by a same water-passing groove 28, the crossed secondary valve passages may be connected to each other through the water-passing groove 28. It will be appreciated that an axial span of each piston part 41 and an axial span of each water-passing groove 28 can be rationally designed by taking into account an axial length of the secondary valve core 12, axial space in which the secondary valve core 12 may move in the second inner chamber, opening positions of the secondary valve passages in the second inner chamber, valve position conditions set for the secondary valve 2, and the like. Accordingly, the opening positions of the secondary valve passages can also be rationally designed by taking into account the axial length of the secondary valve core 12, the axial space in which the secondary valve core 12 may move in the second inner chamber, the axial span of each piston part 41, the axial span of each water-passing groove 28, the valve position conditions set for the secondary valve 2, and the like.

Figure 13:
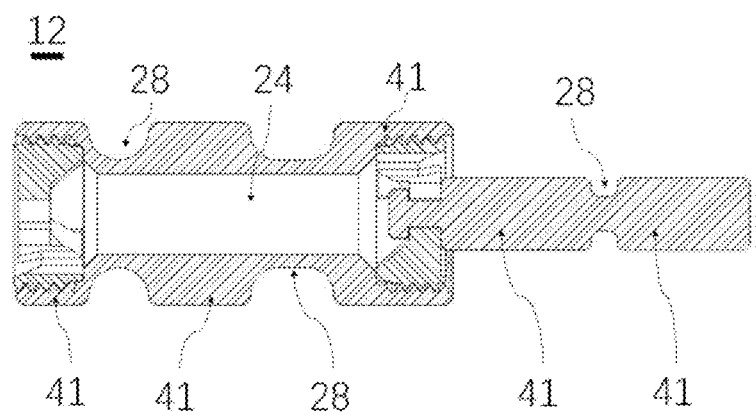
FIG. 13 is a sectional view of the secondary valve core along an E-E line in FIG. 12.

In combination with FIG. 13, in some embodiments, the secondary valve core 12 is also provided with a secondary valve core passage which extends inside the secondary valve core 12 and forms two openings on the secondary valve core 12. By designing specific positions of the two openings, the plurality of secondary valve passages that are not on a span of a same water-passing groove 28 through the secondary valve core passage are connected to each other through the secondary valve core passage 24. A specific number of the secondary valve core passages and the opening positions may be set according to requirements of specific implementation. In this embodiment, the secondary valve core 12 is provided with one secondary valve core passage 24.

Please refer to FIG. 8 and FIG. 9 again, in some embodiments, the secondary valve body 9 also includes a plurality of grilles 27 spaced apart in the second inner chamber. The grilles 27 are in an annular shape. Both inner rings and outer rings of the grilles 27 are provided with sealing elements, the outer rings cooperating with the side wall surface of the second inner chamber to form a seal. The opening of each secondary valve passage is located between two adjacent grilles 27. In this embodiment, the secondary valve core 12 is no longer in contact with the side wall surface of the second inner chamber, but passes through the inner ring of each grille 27, the inner ring of the grille 27 cooperating with the piston part 41 to form a seal. When a certain water-passing groove 28 crosses several grilles 27, the secondary valve passages located on two sides of each of the grilles 27 may be connected through the water-passing groove 28.

It will be appreciated that a number of the secondary valve passages is set according to a use requirement of a water softener to which the secondary valve passages are applied. In order to meet various requirements of the two-tank water softener for continuous water supply and to achieve an in-valve bypass function, please refer to FIG. 1 to FIG. 6, FIG. 8, and FIG. 9 again, in some embodiments, the plurality of secondary valve passages provided on the secondary valve body 9 includes a first secondary valve passage 10, a second secondary valve passage 11, a third secondary valve passage 20, a fourth secondary valve passage 21, and a fifth secondary valve passage 22. The first secondary valve passage 10 is connected to the first main valve passage 6, the second secondary valve passage 11 is connected to the second main valve passage 7, and the third secondary valve passage 20 is connected to the seventh main valve passage 17. The fourth secondary valve passage 21 is configured to connect to a salt tank 33 of the water softener for filling water and absorbing salt. The fifth secondary valve passage 22 is a sewage outlet for discharging saline sewage and waste water generated during regeneration of a first resin tank 29 and a second resin tank 30 into a sewer.

Please refer to FIG. 9, in some embodiments, the secondary valve body 9 is provided with a jet 23. An inlet of the jet 23 is in the second chamber. A nozzle of the jet 23 is connected to the third secondary valve passage 20. A passage between the fourth secondary valve passage 21 and the inlet of the jet 23 is opened during salt absorption, so that brine can be fed through the jet 23 into the third secondary valve passage 20.

Figure 14:
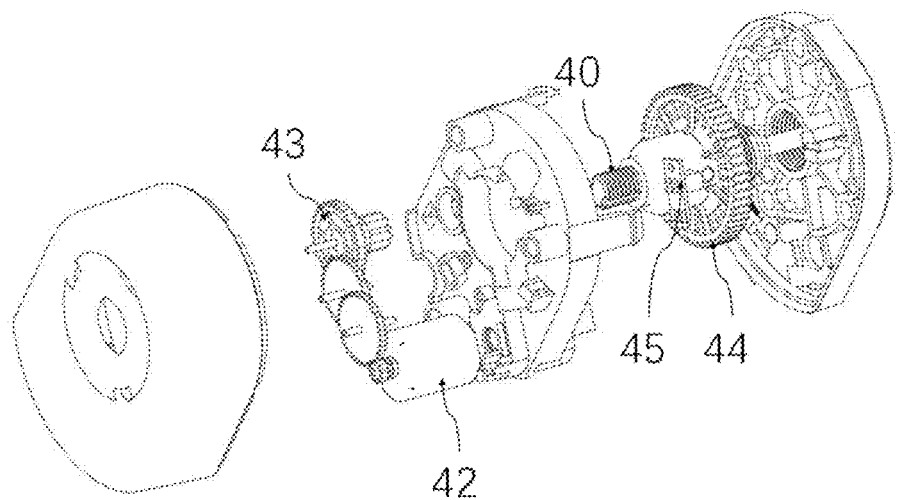
FIG. 14 is an exploded view of a secondary valve driving device of the multi-way valve provided by some embodiments of the present application.
Figure 15:
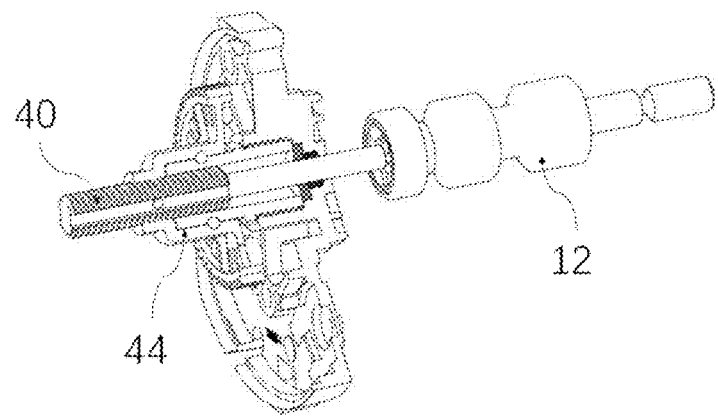
FIG. 15 is a schematic structural diagram of a connection structure of a second driving rod and the secondary valve core provided by some embodiments of the present application.

It will be appreciated that since the main valve core 8 and the secondary valve core 12 have a similar movement manner, which is reciprocating movement between different positions in their respective inner chambers driven by an external force, the main valve driving device 25 and the secondary valve driving device 26 may use a same structure. Hereinafter, the structure of the secondary valve driving device 26 is taken for illustration. In combination with FIG. 14 and FIG. 15, in some embodiments, the secondary valve driving device 26 is driven through screw transmission. The secondary valve driving device includes a removable housing, one side of which may be connected to the secondary valve body 9 through a bolt. A support seat is provided inside the housing. A driving motor 42 and a reduction gear set 43 are mounted on the support seat. Through meshing of the reduction gear set 43 and a driving gear 44, a driving force of the driving motor 42 can be transmitted to the driving gear 44 for rotation. Then, the second driving rod 40 is moved by a screw transmission structure formed by cooperation of an inner ring of the driving gear 44 and the second driving rod 40. Since the second driving rod 40 is connected to the secondary valve core 12, the secondary valve core 12 is moved in the second inner chamber. Further, a grating sensor 45 is provided inside the secondary valve driving device 26. The grating sensor 45 is configured to detect a displacement magnitude so as to accurately control a movement amplitude of the secondary valve core 12. Accordingly, in some embodiments, the structure of the main valve driving device 25 is similar to that of the secondary valve driving device 26. A first driving rod 39 is moved by a screw transmission structure formed by cooperation of an inner ring of a driving gear 44 and the first driving rod 39. Since the first driving rod 39 is connected to the main valve core 8, the main valve core 8 is moved in the first inner chamber. Similar to the secondary valve driving device 26, the main valve driving device 25 may use a grating sensor 45 to detect a movement amplitude of the main valve core 8. Additionally, the main valve core 8 and/or the secondary valve core 12 may be driven through other transmission ways known in the art, for example, worm gear transmission, chain transmission, gear transmission, and belt transmission. A person skilled in the art may choose as required.

Figure 16:
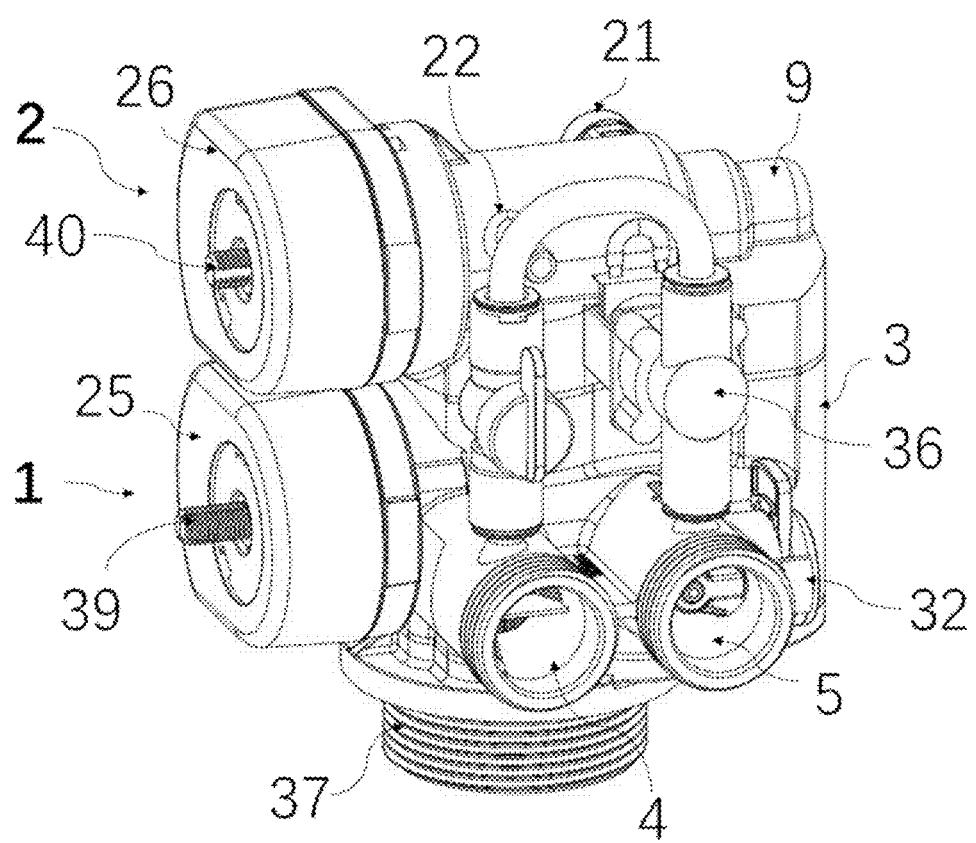
FIG. 16 is a schematic structural diagram showing the multi-way valve provided by some embodiments of the present application, wherein the multi-way valve is provided with a water mixing device.

As shown in FIG. 16, in some embodiments, the multi-way valve further includes a water mixing device 36. When the multi-way valve is applied to a water softener, water outlet hardness of the water softener may be controlled through the water mixing device 36. Specifically, the water mixing device 36 is connected between the water inlet passage 4 and the water outlet passage 5 of the water softener, and includes a water mixing pipe and a regulating valve and a solenoid valve provided in the water mixing line. The regulating valve is configured to regulate a proportion of a water mixing amount to the water outlet passage 5, so that a user obtains desired water hardness. The solenoid valve is an actuator for controlling opening or closing of the water mixing device 36. It will be appreciated that in various embodiments, the regulating valve and the solenoid valve may be present simultaneously or may be integrated into one valve.

Figure 17:
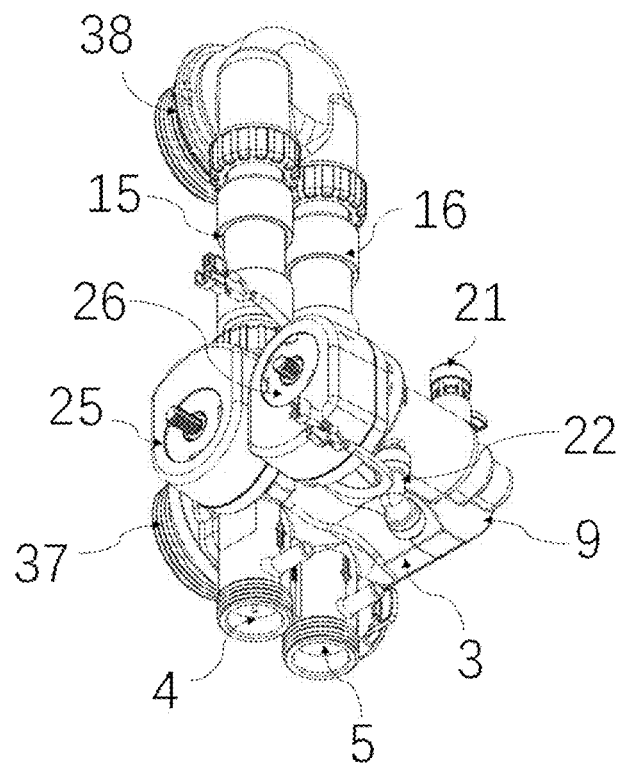
FIG. 17 is a schematic structural diagram showing the multi-way valve provided by some embodiments of the present application, wherein the multi-way valve is provided with a second connection port.
Figure 18:
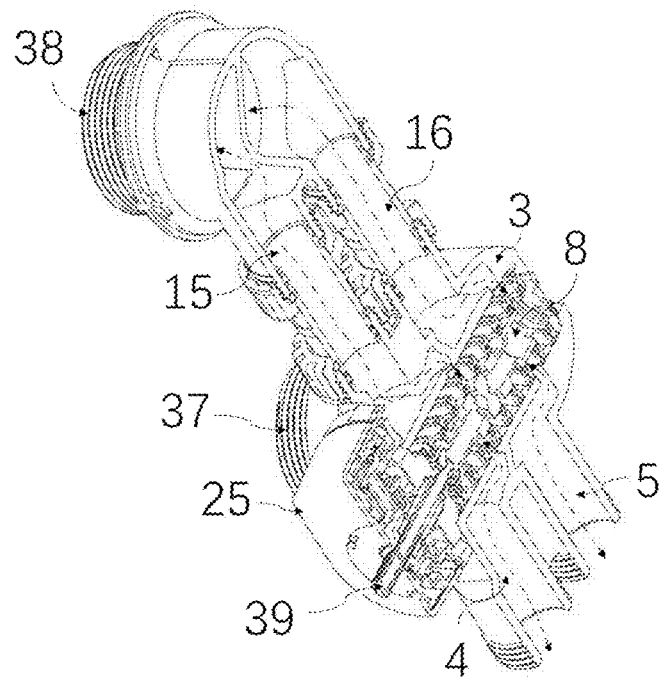
FIG. 18 is a sectional view of the multi-way valve in FIG. 17, wherein dashed lines with arrows indicate a direction of a part of the main valve passages.

As shown in FIG. 17, in some embodiments, the multi-way valve needs to be connected to two resin tanks of the water softener, so that the multi-way valve needs to designed with two connection ports, a first connection port 37 and a second connection port 38. The first connection port 37 is configured to connect to one resin tank of the two-tank water softener for continuous water supply, and the second connection port 38 is configured to connect to the other resin tank of the two-tank water softener for continuous water supply, as long as a size and internal pipe arrangement of each of the connection ports match a corresponding interface of the resin tank. It will be appreciated that when the multi-way valve has the first connection port 37 and the second connection port 38, the first connection port 37 and the second connection port 38 may be considered to belong to two components of the main valve body 3 in the description of the present application. In combination with FIG. 9 and FIG. 18, the third main valve passage 13 and the fourth main valve passage 14 extend into the first connection port 37, and the fifth main valve passage 15 and the sixth main valve passage 16 extend into the second connection port 38, so as to combine with the two resin tanks to form flow paths required for various functions of the water softening processing.

Figure 19:
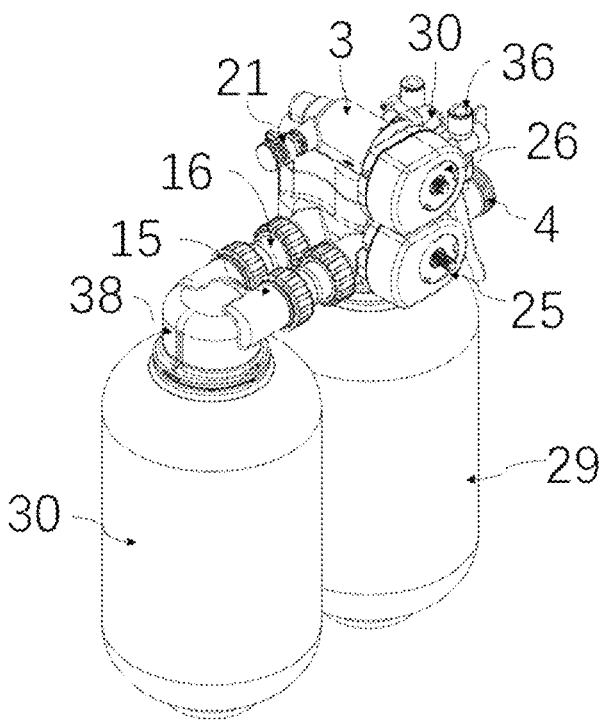
FIG. 19 is a schematic structural diagram illustrating an assembly structure of the multi-way valve of the water softener, a first resin tank, and a second resin tank provided by some embodiments of the present application.
Figure 20:
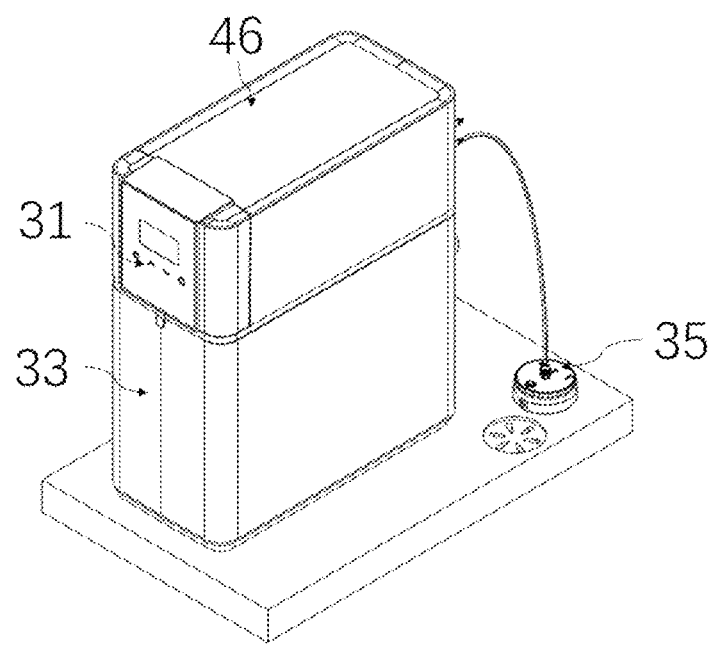
FIG. 20 is a schematic structural diagram of an exterior of the water softener provided by some embodiments of the present application.
Figure 21:
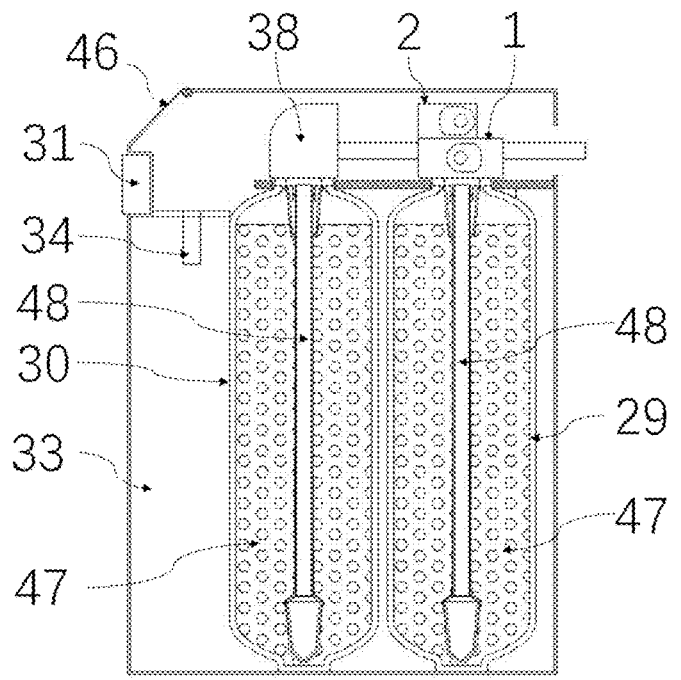
FIG. 21 is a schematic sectional view of a salt tank and an internal structure of the water softener provided by some embodiments of the present application.

As shown in FIG. 19 to FIG. 21, an embodiment of the present application further discloses a water softener. The water softener is a two-tank water softener for continuous water supply which includes the first resin tank 29, the second resin tank 30, a control unit 31, and the multi-way valve disclosed in the embodiments of the present application. The first resin tank 29 is connected to the first connection port 37, and the second resin tank 30 is connected to the second connection port 38. A resin chamber 47 of the first resin tank 29 is connected to the third main valve passage 13 of the multi-way valve, and a central pipe 48 of the first resin tank 29 is connected to the fourth main valve passage 14 of the multi-way valve. A resin chamber 47 of the second resin tank 30 is connected to the fifth main valve passage 15 of the multi-way valve, and a central pipe 48 of the second resin tank 30 is connected to the sixth main valve passage 16 of the multi-way valve. The main valve 1 and the secondary valve 2 of the multi-way valve are connected to the control unit 31 through a control line. A Process Control Block (PCB) is established in the control unit 31. The valve position switch of the multi-way valve is controlled through the PCB of the control unit 31.

In some embodiments, the water softener includes a flow quantity detection device 32 provided on the multi-way valve and configured to detect cumulative flow quantity of the first resin tank 29 and the second resin tank 30. The control unit 31 receives a flow quantity signal of the flow quantity detection device 32, and controls the valve position switch of the multi-way valve according to the flow quantity signal to change working states of the first resin tank 29 and/or the second resin tank 30. Specifically, to be capable of continuously supplying soft water, one of the first resin tank 29 and the second resin tank 30 is a working tank and the other is a standby tank, wherein the resin tank for softening raw water and supplying soft water is the working tank, and the other resin tank is the standby tank. During a water supply period of the working tank, the standby tank completes a regeneration process. When cumulative flow quantity of soft water of the working tank reaches a failure point, the control unit 31 drives the multi-way valve to switch the current working tank to the standby tank and to enter a regeneration state; and after completing regeneration, the current standby tank is switched to the working tank and enters a raw water processing and soft water supply state. The flow quantity detection device 32 may be mounted on the water outlet passage 5. When the multi-way valve is further provided with the water mixing device 36, the flow quantity detection device 32 is mounted upstream of a connection position between the water mixing pipe and the water outlet passage 5, thereby improving detection accuracy. Of course, for more accurate detection, in some embodiments, the flow quantity detection device 32 may be mounted on the fourth main valve passage 14 and the sixth main valve passage 16 to directly detect flow quantity of soft water processed by the first resin tank 29 and the second resin tank 30.

In some embodiments, the water softener includes a salt tank 33. The first resin tank 29, the second resin tank 30, and the multi-way valve are all provided inside the salt tank 33 and fixed by a cover 46. The control unit 31 is mounted on the salt tank 33. An operation button and/or a control panel may be provided on the control unit 31 to facilitate user control.

In some embodiments, the water softener includes a salt level detection device 34. The salt level detection device 34 is mounted in the salt tank 33 and configured to detect a salt level in the salt tank 33 and transmit a salt level signal to the control unit. More specifically, the salt level detection device 34 may be a salt-level detector mounted on a lower portion of the cover 46. The control unit 31 receives the salt level signal from the salt level detection device 34, and when determining that the salt level is lower than a threshold value, issues an alarm. Salt shortage information may be displayed through an icon on a display screen of a control system to remind the user of replenishing regenerated salt in time, thereby improving user experience. This avoids regeneration failure due to absence of the regenerated salt, and avoids the user from using hard water.

In some embodiments, the water softener includes a water leakage alarm device 35. The water leakage alarm device 35 is connected to the control unit 31. The water leakage alarm device 35 transmits a water leakage signal to the control unit 31 when the water leakage alarm device 35 detects water leakage, and the control unit 31 controls the multi-way valve to close. Specifically, in some embodiments, the water leakage alarm device 35 may be installed on the ground near the water softener. When the water leakage occurs in the vicinity of the water softener, the water accumulated on the ground increases. When the accumulated water is higher than an internal monitoring electrode of the water leakage alarm device 35, the water leakage alarm device 35 is turned on and feeds a signal back to the control unit 31. The control unit 31 drives the multi-way valve to close and cuts off water flow in pipelines of the water softener, thereby cutting off a leakage point in the water softener and protecting property of the user.

In some embodiments, the water softener includes a water mixing device 36. The water outlet hardness of the water softener is controlled by installing the water mixing device 36. Specifically, in some embodiments, the water mixing device 36 is connected between the water inlet passage 4 and the water outlet passage 5 of the water softener, and includes a water mixing pipe and a regulating valve and a solenoid valve provided in the water mixing line. The regulating valve is configured to regulate a proportion of a water mixing amount to a water outlet, so that the user obtains desired water hardness. The solenoid valve is an actuator for controlling opening or closing of the water mixing device 36. It will be appreciated that in various embodiments, the regulating valve and the solenoid valve may be present simultaneously, or functions of the regulating valve and the solenoid valve may be integrated in one valve that can exists on its own. The water mixing device 36 is controlled by the control unit 31. The water mixing amount of the water mixing device 36 is adjusted according to requirements of the user for water outlet hardness, so that mixed hard water reaches a target water mixing ratio and the water outlet reaches a demand value of the user. In some embodiments, when the water softener has a water leakage detection function and detects water leakage, the control unit 31 closes the water mixing device 36 and cuts off the water mixing pipe.

Hereinafter, various working states of the water softener provided in the embodiments of the present invention will be described. In order to clearly show the various working states of the water softener according to the embodiments of the present application, in each of FIG. 22 to FIG. 27 provided in the description of the present application, a sectional structure of the multi-way valve is adjusted, so that the main valve passages and the secondary valve passages of the multi-way valve at different space positions are adjusted to a same section to clearly illustrate flow paths. It will be appreciated by those skilled in the art that, for a multi-way valve with a three-dimensional structure, the main valve passages or secondary valve passages may be located at different positions in a three-dimensional space and may not necessarily be in a same section in practical implementation.

Figure 22:
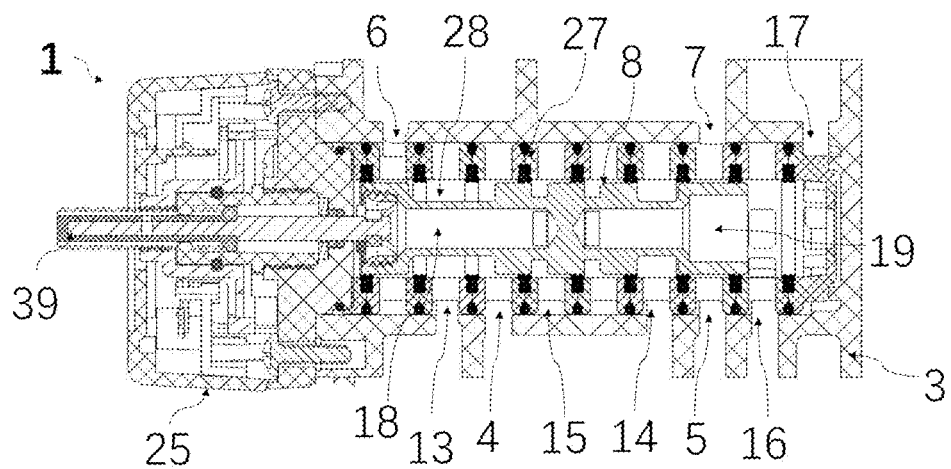
FIG. 22 is a schematic sectional view of a main valve in some embodiments of the present application, wherein each main valve passage is shown in a same profile.
Figure 23:
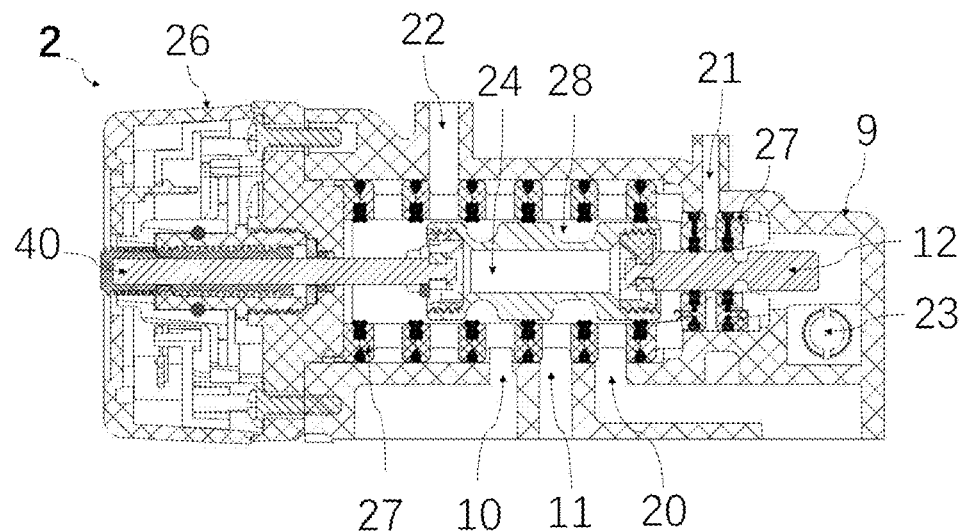
FIG. 23 is a schematic sectional view of a secondary valve in some embodiments of the present application, wherein each secondary valve passage is shown in a same profile.
Figure 24:
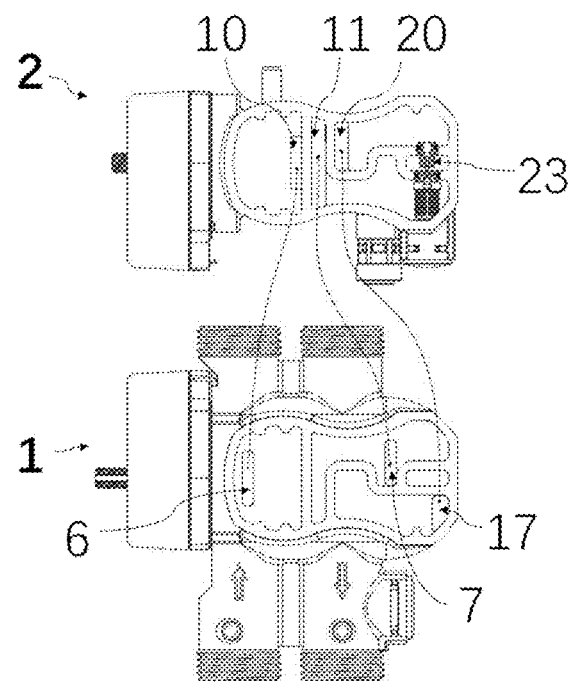
FIG. 24 is a schematic diagram illustrating a connection relationship between the main valve and the secondary valve in an embodiment of the present application.

In combination with FIG. 22 to FIG. 24, in some embodiments, the first inner chamber of the main valve body 3 is provided with nine grilles 27 spaced apart. The nine grilles 27 are numbered as a, b, c, d, e, f, g, h, and i from left to right according to a drawing orientation. An opening of the first main valve passage 6 is located between the grilles 27 numbered as a and b, an opening of the third main valve passage 13 is located between the grilles 27 numbered as b and c, an opening of the water inlet passage 4 is located between the grilles 27 numbered as c and d, an opening of the fifth main valve passage 15 is located between the grilles 27 numbered as d and e, an opening of the fourth main valve passage 14 is located between the grilles 27 numbered as f and g, an opening of the second main valve passage 7 and an opening of the water outlet passage 5 are located between the grilles 27 numbered as g and h, an opening of the sixth main valve passage 16 is located between the grilles 27 numbered as h and i, and an opening of the seventh main valve passage 17 is located on the right side of the grille 27 numbered as i.

In combination with FIG. 22 to FIG. 24, in some embodiments, the second inner chamber of the secondary valve body 9 is provided with eight grilles 27 spaced apart. The eight grilles 27 are numbered as A, B, C, D, E, F, G, and H from left to right according to the drawing orientation. An opening of the first secondary valve passage 10 is located between the grilles 27 numbered as C and D, an opening of the second secondary valve passage 11 is located between the grilles 27 numbered as D and E, an opening of the third secondary valve passage 20 is located between the grilles 27 numbered as E and F, an opening of the fourth secondary valve passage 21 is located between the grilles 27 numbered as G and H, an opening of the fifth secondary valve passage 22 is located between the grilles 27 numbered as B and C, the inlet of the jet 23 is located on the right side of the grille 27 numbered as H, and the nozzle of the jet 23 is inserted into a connection chamber in which the third secondary valve passage 20 is located so as to connect to the third secondary valve passage 20.

It should be clear that the water softener changes the flow path through the valve position switch of the multi-way valve, thereby changing the working state. In some embodiments, the main valve 1 has a bypass valve position, a first valve position, and a second valve position, and the secondary valve 2 has a bypass valve position, a third valve position, a fourth valve position, a fifth valve position, a sixth valve position, and a closing valve position.

Figure 25:
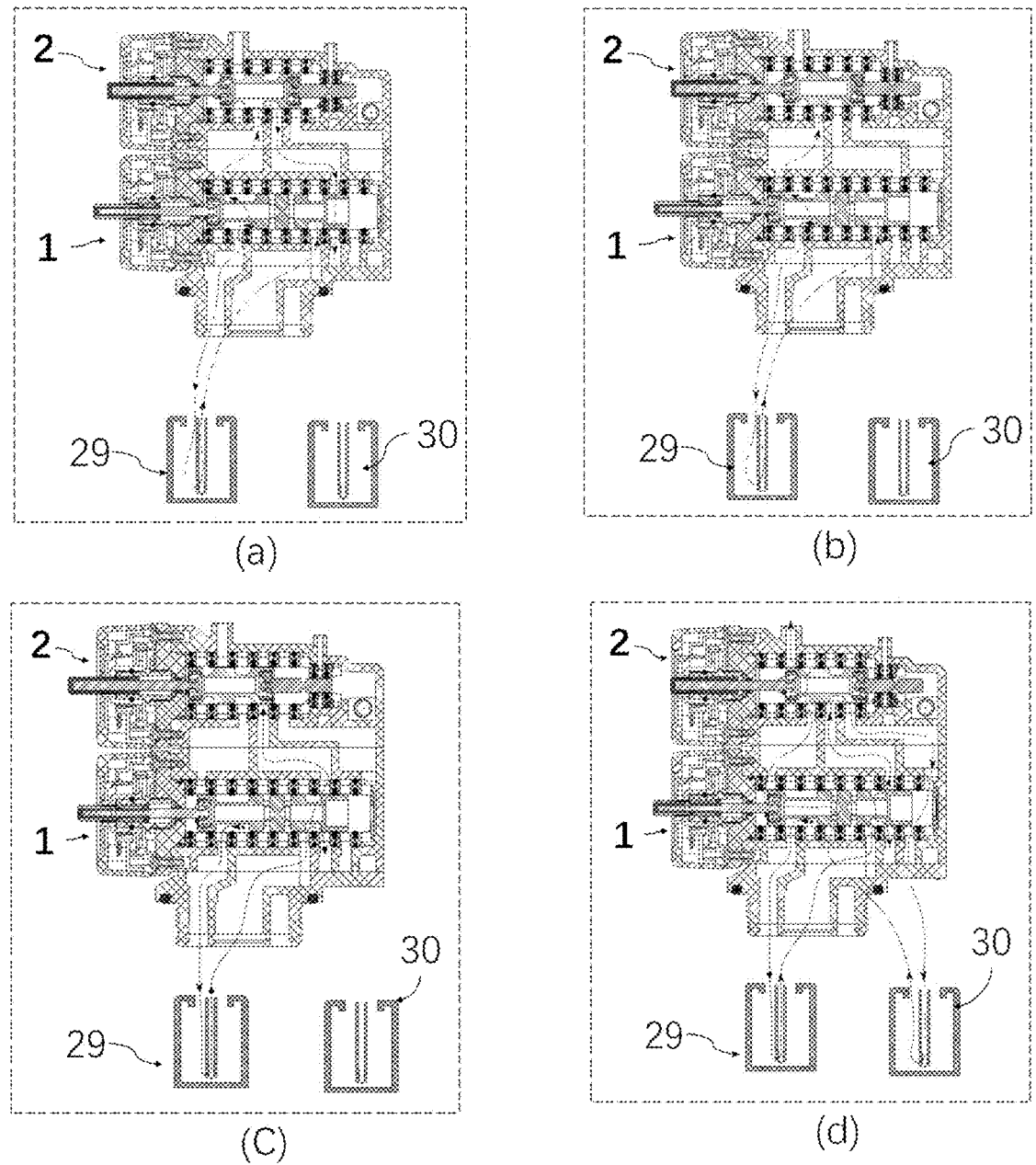
FIG. 25 is a schematic diagram of a working principle of the water softener in some embodiments of the present application, wherein: (a) shows a flow path condition when each of the main valve and the secondary valve is at a bypass valve position; (b) shows a flow path condition when the main valve is at the bypass valve position and the secondary valve is at a closing valve position; (c) shows a flow path condition when the first resin tank supplies water and the second resin tank is closed; (d) shows a flow path condition when the first resin tank supplies water and the second resin undergoes backwashing.

As shown in FIG. 25(*a*), when each of the main valve 1 and the secondary valve 2 is at the bypass valve position, the water inlet passage 4, the first main valve passage 6, the first secondary valve passage 10, the second secondary valve passage 11, the second main valve passage 7, and the water outlet passage 5 are sequentially connected. The water entering the water inlet passage 4 passes through the first main valve passage 6, the first secondary valve passage 10, the second secondary valve passage 11, and the second main valve passage 7 in sequence, and then flows out from the water outlet passage 5. At this time, although the water inlet passage 4 and the third main valve passage 13 are also in a connected state, the water flowing through the first resin tank 29 is blocked by the grilles 27 numbered as f and g at the opening of the fourth main valve passage 14, and a passage cannot be formed. Thus, when each of the main valve 1 and the secondary valve 2 is at the bypass valve position, the water softener is in a bypass working state, and the water softener outputs hard water that has not been softened.

As shown in FIG. 25(*b*), when the main valve 1 is at the bypass valve position and the secondary valve 2 is at the closing valve position, the water entering the water inlet passage 4 passes through the first main valve passage 6, and then is blocked by the grilles 27 numbered as C and D in the first secondary valve passage 10 and cannot continue flowing. The water flowing through the first resin tank 29 via the third main valve passage 13 is blocked by the grilles 27 numbered as f and g at the opening of the fourth main valve passage 14, and likewise a passage cannot be formed. Thus, when the main valve 1 is at the bypass valve position and the secondary valve 2 is at the closing valve position, the water softener is in the closed state and no more water is supplied.

Figure 26:
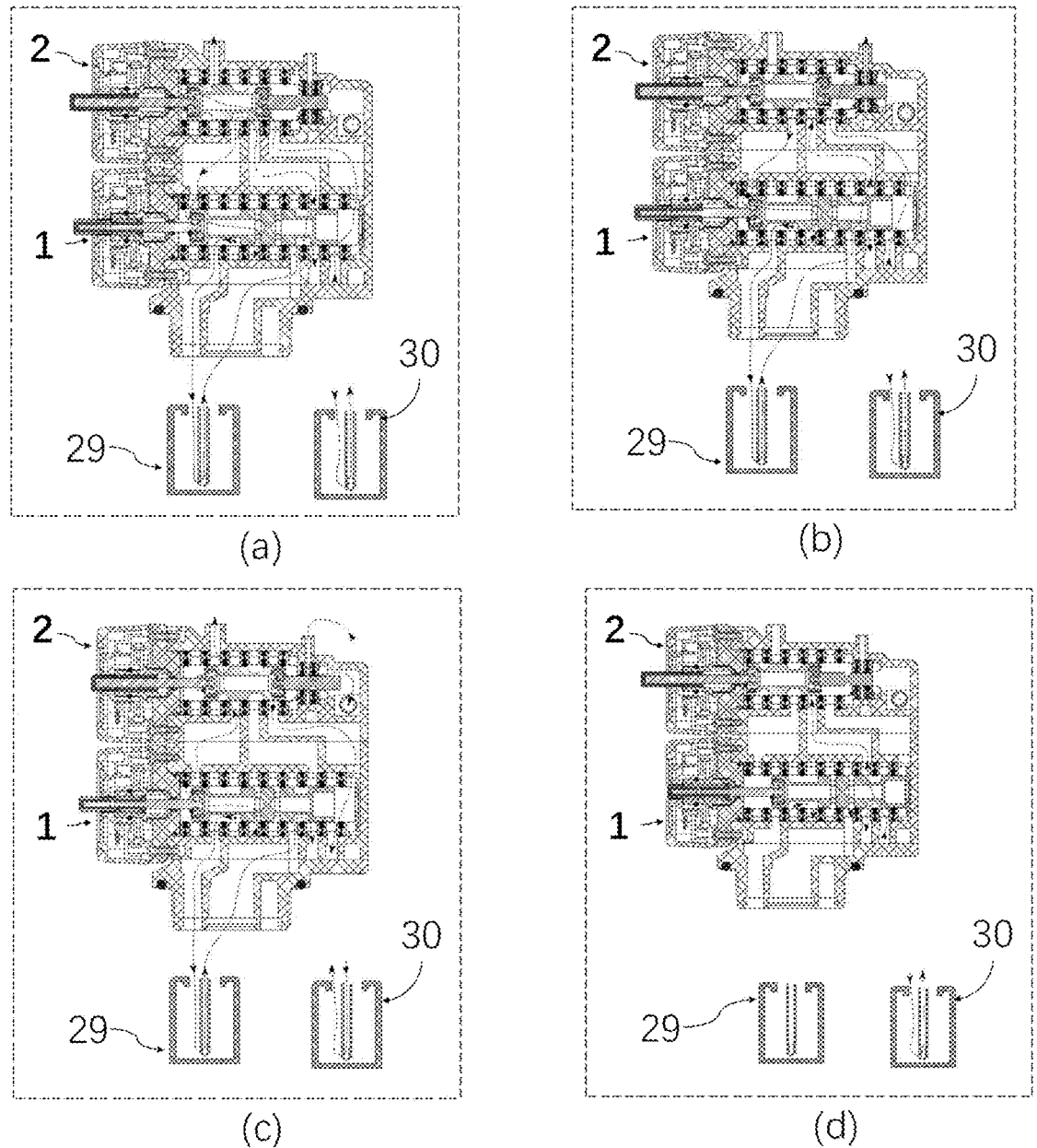
FIG. 26 is a schematic diagram of a working principle of the water softener according to some embodiments of the present application, wherein: (a) shows a flow path condition when the first resin tank supplies water and the second resin tank undergoes forward washing; (b) shows a flow path condition when the first resin tank supplies water and the second resin fills water in the salt tank. (c) shows a flow path condition when the first resin tank supplies water and the second resin tank absorbs salt; (d) shows a flow path condition when the second resin tank supplies water and the second resin tank is closed.
Figure 27:
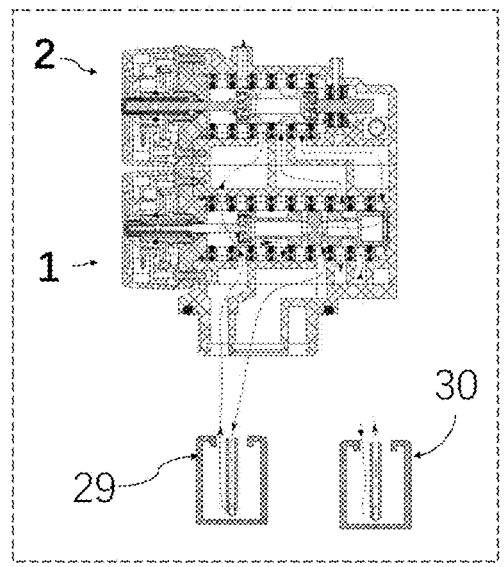
FIG. 27 is a schematic diagram of a working principle of the water softener in some embodiments of the present application, wherein: (a) shows a flow path condition when the second resin tank supplies water and the first resin undergoes backwashing; (b) shows a flow path condition when the second resin tank supplies water and the first resin undergoes forward washing; (c) shows a flow path condition when the second resin tank supplies water and the first resin tank fills water in the salt tank; and (d) shows a flow path condition when the second resin tank supplies water and the first resin tank absorbs salt.
Figure 27:
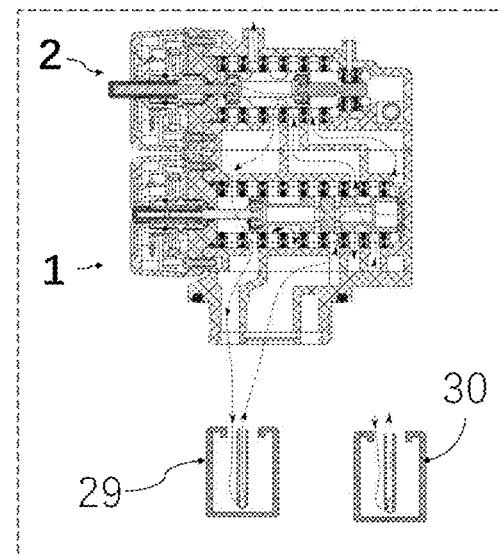
Figure 27:
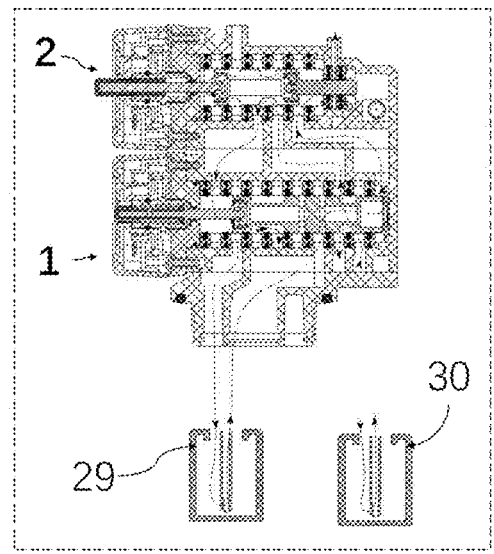
Figure 27:
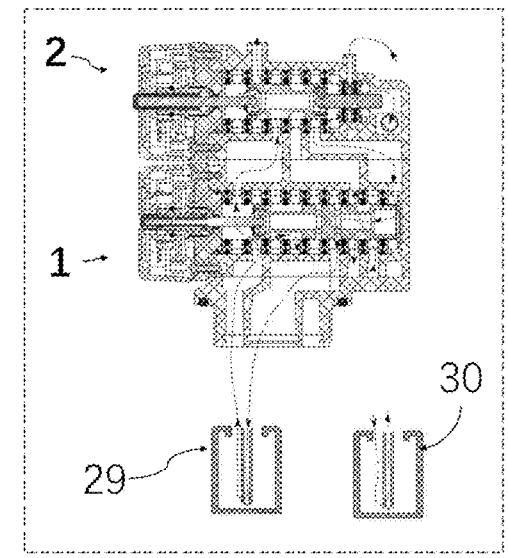

As shown in FIG. 25(*c*), when the main valve 1 is at the first valve position and the secondary valve 2 is at the closing valve position, the water inlet passage 4 is connected to the third main valve passage 13, and the water outlet passage 5 is connected to the fourth main valve passage 14 and the second main valve passage 7. At this time, the water flowing in from the water inlet passage 4 enters the first resin tank 29 through the third main valve passage 13, and then flows into the water outlet passage 5 and the second main valve passage 7 through the fourth main valve passage 14. However, the water passing through the second main valve passage 7 is blocked by the grilles 27 numbered as D and E at the opening of the second secondary valve passage 11, and no passage is formed. Therefore, the water softener is in a working state in which the first resin tank 29 supplies water and the second resin tank 30 is closed. It should be explained particularly that despite different positions of the secondary valve core 12 in FIG. 27 and FIG. 26, an effect of the secondary valve core 12 in FIG. 27 and FIG. 26 is same. The secondary valve passages of the secondary valve 2 are not connected, thus the secondary valve 2 is at the closing valve position.

As shown in FIG. 25(*d*), when the main valve 1 is at the first valve position and the secondary valve 2 is at the fifth valve position, the water entering the water inlet passage 4 flows through the third main valve passage 13, the first resin tank 29, and the fourth main valve passage 14 and is divided into two paths. One of the two paths flows out from the water outlet passage 5. The other one of the two paths flows through the second secondary valve passage 11, the third secondary valve passage 20, the seventh main valve passage 17, and the sixth main valve passage 16 via the second main valve passage 7, then enters the second resin tank 30, flows through the central pipe 48 and the resin chamber 47 sequentially, then exits the second resin tank 30, and flows out through the fifth main valve passage 15, the first main valve core passage 18, the first main valve passage 6, the first secondary valve passage 10, and the fifth secondary valve passage 22. Therefore, the water softener is in a working state in which the first resin tank 29 supplies water and the second resin tank 30 undergoes backwashing.

As shown in FIG. 26(*a*), when the main valve 1 is at the first valve position and the secondary valve 2 is at the sixth valve position, the water entering the water inlet passage 4 flows through the third main valve passage 13, the first resin tank 29, and the fourth main valve passage 14, and is divided into two paths. One of the two paths flows out from the water outlet passage 5. The other one of the two paths flows through the second secondary valve passage 11, the first secondary valve passage 10, the first main valve passage 6, the first main valve core passage 18, and the fifth main valve passage 15 via the second main valve passage 7, then enters the second resin tank 30, flows through the resin chamber 47 and the central pipe 48, then exits the second resin tank 30, and flows out through the sixth main valve passage 16, the seventh main valve passage 17, the third secondary valve passage 20, the secondary valve core passage 24, and the fifth secondary valve passage 22. Therefore, the water softener is in a working state in which the first resin tank 29 supplies water and the second resin tank 30 undergoes forward washing.

As shown in FIG. 26(*b*), when the main valve 1 is at the first valve position and the secondary valve 2 is at the third valve position, the water entering the water inlet passage 4 flows through the third main valve passage 13, the first resin tank 29, and the fourth main valve passage 14, and is divided into two paths. One of the two paths flows out from the water outlet passage 5. The other one of the two paths flows through the second secondary valve passage 11, the first secondary valve passage 10, the first main valve passage 6, the first main valve core passage 18, and the fifth main valve passage 15 via the second main valve passage 7, then enters the second resin tank 30, flows through the resin chamber 47 and the central pipe 48, then exits the second resin tank 30, and entering the salt tank 33 via the sixth main valve passage 16, the seventh main valve passage 17, the third secondary valve passage 20, and the fourth secondary valve passage 21. The regenerated salt in the salt tank 33 is dissolved in the water filled in the salt tank 33 to make preparation for resin regeneration in the water softener. Therefore, the water softener is in a working state in which the first resin tank 29 supplies water and the second resin tank 30 fills water in the salt tank.

As shown in FIG. 26(*c*), when the main valve 1 is at the first valve position and the secondary valve 2 is at the fourth valve position, the water entering the water inlet passage 4 flows through the third main valve passage 13, the first resin tank 29, and the fourth main valve passage 14 and flows out from the water outlet passage 5 for supplying water. Salt water in the salt tank 33 is sucked through the fourth secondary valve passage 21 by the jet 23, and is sprayed into the third secondary valve passage 20 from the nozzle of the jet 23, flows into the second resin tank 30 through the seventh main valve passage 17 and the sixth main valve passage 16, flows through the central pipe 48 and the resin chamber 47 sequentially, and then exits the second resin tank 30, flows out through the fifth main valve passage 15, the first main valve core passage 18, the first main valve passage 6, the first secondary valve passage 10, and the fifth secondary valve passage 22 sequentially, and is discharged into a sewage pipe. Therefore, the water softener is in a working state in which the first resin tank 29 supplies water and the second resin tank 30 absorbs salt and performs regeneration.

As shown in FIG. 26(d), when the main valve 1 is at the second valve position and the secondary valve 2 is at the closing valve position, the water inlet passage 4 is connected to the fifth main valve passage 15, and the water outlet passage 5 is connected to the sixth main valve passage 16 and the second main valve passage 7. At this time, the water flowing in from the water inlet passage 4 enters the second resin tank 30 through the fifth main valve passage 15, and then flows into the water outlet passage 5 and the second main valve passage 7 through the sixth main valve passage 16. However, the water flowing through the second main valve passage 7 is blocked by the grilles 27 numbered as D and E at the opening of the second secondary valve passage 11, and no passage is formed. Therefore, the water softener is in a working state in which the first resin tank 29 is closed and the second resin tank 30 supplies water.

As shown in FIG. 27(a), when the main valve 1 is at the second valve position and the secondary valve 2 is at the fifth valve position, the water entering the water inlet passage 4 flows through the fifth main valve passage 15, the second resin tank 30, the sixth main valve passage 16, and is divided into two paths. One of the two paths flows out from the water outlet passage 5. The other one of the two paths flows through the second secondary valve passage 11, the third secondary valve passage 20, the seventh main valve passage 17, and the second main valve core passage 19 via the second main valve passage 7, then enters the first resin tank 29, flows through the central pipe 48 and the resin chamber 47 sequentially, then exits the first resin tank 29, and flows out through the third main valve passage 13, the first main valve passage 6, the first secondary valve passage 10, and the fifth secondary valve passage 22. Therefore, the water softener is in a working state in which the second resin tank 30 supplies water and the first resin tank 29 undergoes backwashing.

As shown in FIG. 27(b), when the main valve 1 is at the second valve position and the secondary valve 2 is at the sixth valve position, the water entering the water inlet passage 4 flows through the fifth main valve passage 15, the second resin tank 30, the sixth main valve passage 16, and is divided into two paths. One of the two paths flows out from the water outlet passage 5. The other one of the two paths flows through the second secondary valve passage 11, the first secondary valve passage 10, the first main valve passage 6, and the third main valve passage 13 via the second main valve passage 7, then enters the first resin tank 29, flows through the resin chamber 47 and the central pipe 48, then exits the first resin tank 29, and flows out through the fourth main valve passage 14, the second main valve core passage 19, the seventh main valve passage 17, the third secondary valve passage 20, the secondary valve core passage 24, and the fifth secondary valve passage 22. Therefore, the water softener is in a working state in which the second resin tank 30 supplies water and the first resin tank 29 undergoes forward washing.

As shown in FIG. 27(c), when the main valve 1 is at the second valve position and the secondary valve 2 is at the third valve position, the water entering the water inlet passage 4 flows through the fifth main valve passage 15, the second resin tank 30, the sixth main valve passage 16, and is divided into two paths. One of the two paths flows out from the water outlet passage 5. The other one of the two paths flows through the second secondary valve passage 11, the first secondary valve passage 10, the first main valve passage 6, and the third main valve passage 13 via the second main valve passage 7, then enters the first resin tank 29, flows through the resin chamber 47 and the central pipe 48, then exits the first resin tank 29, and enters the salt tank 33 via the fourth main valve passage 14, the second main valve core passage 19, the seventh main valve passage 17, the third secondary valve passage 20, and the fourth secondary valve passage 21. The regenerated salt in the salt tank 33 is dissolved in the water filled in the salt tank 33 to make preparation for resin regeneration in the water softener. Therefore, the water softener is in a working state in which the second resin tank 30 supplies water and the first resin tank 29 fills water in the salt tank.

As shown in FIG. 27(d), when the main valve 1 is at the second valve position and the secondary valve 2 is at the fourth valve position, the water entering the water inlet passage 4 flows through the fifth main valve passage 15, the second resin tank 30, and the sixth main valve passage 16, and flows out from the water outlet passage 5. The salt water in the salt tank 33 is sucked through the fourth secondary valve passage 21 by the jet 23, and is sprayed into the third secondary valve passage 20 from the nozzle of the jet 23, flows into the first resin tank 29 through the seventh main valve passage 17, the second main valve core passage 19, and the fourth main valve passage 14, flows through the central pipe 48 and the resin chamber 47 sequentially, then exits the first resin tank 29, flows out through the third main valve passage 13, the first main valve passage 6, the first secondary valve passage 10, and the fifth secondary valve passage 22 sequentially, and is discharged into a sewage pipe. Therefore, the water softener is in a working state in which the second resin tank 30 supplies water and the first resin tank 29 absorbs salt and performs regeneration.

Figure 28:
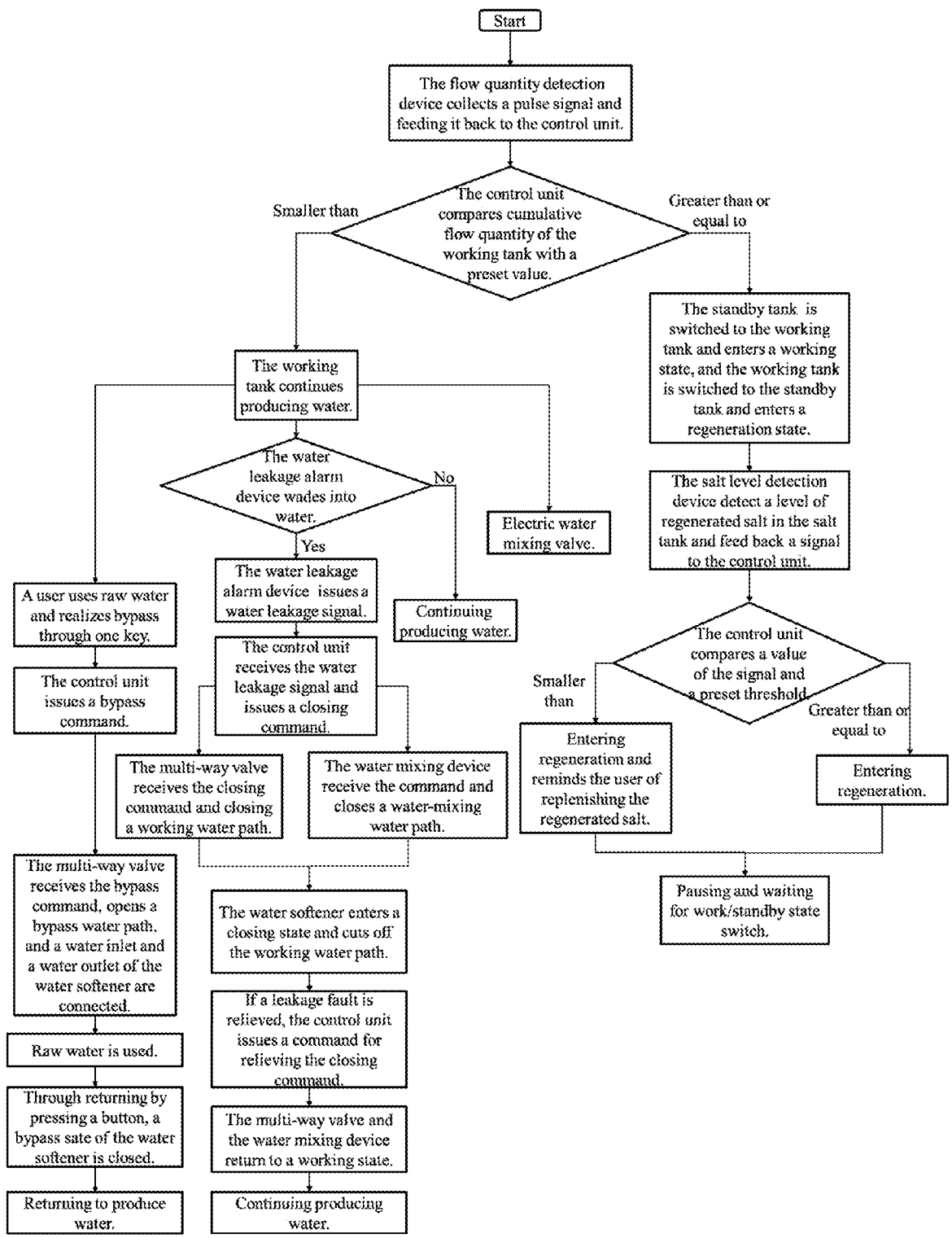
FIG. 28 is a schematic diagram of a control flow of the water softener in some embodiments of the present application.

As shown in FIG. 28, an embodiment of the present invention further provides a method for controlling the water softener. To facilitate description of the method, one of the first resin tank 29 and the second resin tank 30 that supplies soft water is defined as a working tank, and the other one is defined as a standby tank.

The method for controlling the water softener includes: collecting a pulse signal of a flow quantity of soft water of the working tank through the flow quantity detection device 32, and feeding back the pulse signal to the control unit 31; and calculating cumulative flow quantity of soft water of the working tank and comparing the cumulative flow quantity of soft water with a preset value through the control unit 31.

In some embodiments, when the cumulative flow quantity of soft water reaches the preset value, that is, the cumulative flow quantity of soft water is greater than or equal to the preset value, the control unit 31 controls the multi-way valve to switch valve positions, so that the working tank and the standby tank are switched, the standby tank is switched into the working tank and enters a working state, and the working tank is switched into the standby tank and enters a regeneration state to complete a regeneration process including forward washing, backwashing, filling water, and salt absorption, etc., through controlling the valve position switch. When the cumulative flow quantity of soft water is less than the preset value, the working tank continues to supply the soft water.

In some embodiments, the method for controlling the water softener further includes bringing both the main valve 1 and the secondary valve 2 into a bypass state by controlling the multi-way valve, and the water softener directly supplying hard water. Specifically, when a user encounters a life scenario without the need to use soft water, such as watering flowers or washing cars, the user may issue a bypass command through the control unit 31, the multi-way valve receives the bypass command and switch the valve positions of the main valve 1 and the secondary valve 2 to a bypass valve position, and the water softener directly supplies raw water that has not been softened. In some embodiments, a bypass button and a return button may be provided on a control panel of the control unit 31 to facilitate the user to realize bypass and returning to a state for supplying soft water through one key respectively.

In some embodiments, the method for controlling the water softener includes determining whether the salt level in the salt tank 33 is lower than the threshold value, and issuing an alarm when the salt level is lower than the threshold value. Specifically, the salt level detection device 34 detects a level of the regenerated salt in the salt tank 33 in real time, and feeds back a signal to the control unit 31. The control unit 31 compares a value of a salt level signal with a set threshold value, and when the value is smaller than the set threshold value, issue an alarm to remind the user of replenishing the regenerated salt. To avoid insufficiency of the current regeneration, which affects water production of the water softener, in some embodiments, the threshold value of the alarm may reserve an amount of regenerated salt required for complete regeneration more than three times.

In some embodiments, the method for controlling the water softener includes controlling the multi-way valve to make the main valve 1 enter the bypass state and the secondary valve 2 enter the closing state when detecting water leakage, thereby closing the multi-way valve. Specifically, the water leakage alarm device 35 detects water accumulation on the ground in a use environment of the water softener. When a pipe used by the user leaks, if leaked water accumulated on the ground exceeds a detection point of the water leakage alarm device 35, a water leakage signal is issued to the control unit 31, and the control unit 31 controls the multi-way valve to close. At this time, inlet and outlet water of the water softener is cut off, the water entering the water softener does not flow out from the water outlet passage 5, and a leakage point of a downstream pipe of the water softener will not leak further, thereby reducing a risk of property loss of the user. When a water leakage fault of the user is relieved, the closed state of the water softener is manually relieved, and the control unit 31 controls the multi-way valve to enter the working state and continues to supply soft water to the user.

In some embodiments, the method for controlling the water softener includes based on water hardness requirement of the user, through the control unit, controlling water mixing quantity of the water mixing device and adjusting water outlet hardness of the water softener; and when detecting the water leakage, through the control unit, controlling the water mixing device 36 to be closed. Specifically, a part of raw water in the water inlet passage 4 of the water softener is directly mixed into soft water in the water outlet passage 5 of the water softener by the water mixing device 36, so as to obtain soft water of a certain hardness value, thereby satisfying requirements of some users for using water of the certain hardness value. In some embodiments, when the water softener is provided with both the water mixing device 36 and the water leakage alarm device 35, when detecting water leakage, the control unit 31 closes the water mixing device 36 to prevent water entering the water inlet passage 4 from passing from the water inlet passage 4 to a pipe leakage point.

In the above-mentioned embodiments, the description of each embodiment has its own emphasis, and parts not described in detail in a certain embodiment may be referred to related description of other embodiments.

Compared with the prior art, the multi-way valve of the present invention is provided with the main valve and the secondary valve, and each of the main valve and the secondary valve has the bypass valve position. When each of the main valve and the secondary valve is at the bypass valve position, the water inlet passage, the first main valve passage, the first secondary valve passage, the second secondary valve passage, the second main valve passage, and the water outlet passage of the multi-way valve are sequentially connected, thereby forming a bypass flow path in the multi-way valve. In this way, a bypass function can be realized without additionally installing an external bypass valve on a water supply pipeline of a user, and a water leakage risk additionally added by the external bypass valve is effectively avoided. In addition, achieving various functions through the valve position switch facilitates automatic control, which thereby improves adaptability to a certain extent, and can be better adapted to applications of a two-tank water softener for continuous water supply.

Compared with the prior art, the water softener of the present invention is provided with the above multi-way valve. On one hand, a function of alternating continuous water supply of two tanks can be realized through cooperation of the main valve and the secondary valve, thereby satisfying a requirement of continuous water supply of a user. On the other hand, it is possible to realize a bypass function through the valve position switch of the multi-way valve, thereby realizing an automatic direct supply of hard water, which improves use convenience of the water softener and further ensures safety of using water.

Compared with the prior art, the method for controlling the water softener of the present application provides a control basis for a working state switch of the two tanks, and makes usage of the water softener more convenient.

A multi-way valve, a water softener, and a method for controlling the water softener provided by embodiments of the present application is described in detail. Specific embodiments are applied to describe the principle and implementation ways of the present application. The description of the above embodiments is merely intended to help understand technical solutions and the core idea of the present application. It will be appreciated by those of ordinary skill in the art that modifications may still be made to the technical solutions described in the foregoing embodiments, or equivalents may be made to some of the technical features therein. However, these modifications or equivalents do not depart the essence of the corresponding technical solutions from the scope of the technical solutions of the embodiments of the present application.

What is claimed is:

1. A multi-way valve comprising:
 a main valve, comprising:
  a main valve body comprising a first inner chamber, wherein the main valve body is provided with main valve passages connected to the first inner chamber, the main valve passages comprising a water inlet passage, a water outlet passage, a first main valve passage, and a second main valve passage; and
  a main valve core provided in the first inner chamber, wherein the main valve core moves in the first inner chamber to open or close passages between the main valve passages to realize a valve position switch of the main valve; and a secondary valve, comprising:
  a secondary valve body comprising a second inner chamber, wherein the secondary valve body is provided with secondary valve passages connected to the second inner chamber, the secondary valve passage comprising a first secondary valve passage connected to the first main valve passage and a second secondary valve passage connected to the second main valve passage; and
  a secondary valve core provided in the second inner chamber, the secondary valve core moving in the second inner chamber to open or close passages between the secondary valve passages to realize a valve position switch of the secondary valve;
  wherein each of the main valve and the secondary valve comprises a bypass valve position, when each of the main valve and the secondary valve is at the bypass valve position, the water inlet passage, the first main valve passage, the first secondary valve passage, the second secondary valve passage, the second main valve passage, and the water outlet passage are sequentially connected,
  wherein the main valve comprises a first valve position, and the main valve passages comprise a third main valve passage and a fourth main valve passage, wherein when the main valve is at the first valve position, the water inlet passage is connected to the third main valve passage, and the water outlet passage is connected to the fourth main valve passage and the second main valve passage,
  the main valve comprises a second valve position, and the main valve passages comprise a fifth main valve passage and a sixth main valve passage, wherein when the main valve is at the second valve position, the water inlet passage is connected to the fifth main valve passage, the water outlet passage is connected to the sixth main valve passage and the second main valve passage, and the first main valve passage is connected to the third main valve passage,
  the main valve passages comprise a seventh main valve passage, wherein when the main valve is at the first valve position, the sixth main valve passage is connected to the seventh main valve passage.

2. The multi-way valve of claim 1, wherein the main valve core comprises a first main valve core passage, wherein when the main valve is at the first valve position, the first main valve passage is connected to the fifth main valve passage through the first main valve core passage.

3. The multi-way valve of claim 1, wherein the main valve core comprises a second main valve core passage, wherein when the main valve is at the second valve position, the fourth main valve passage is connected to the seventh main valve passage through the second main valve core passage.

4. The multi-way valve of claim 1, wherein the secondary valve comprises a third valve position, the secondary valve passage comprises a third secondary valve passage and a fourth secondary valve passage, and the third secondary valve passage is connected to the seventh main valve passage; wherein when the secondary valve is at the third valve position, the third secondary valve passage is connected to the fourth secondary valve passage.

5. The multi-way valve of claim 4, wherein the secondary valve comprises a fourth valve position, the secondary valve passage comprises a fifth secondary valve passage, a jet is provided in the secondary valve body, and a nozzle of the jet is connected to the third secondary valve passage; wherein when the secondary valve is at the fourth valve position, the first secondary valve passage is connected to the fifth secondary valve passage, and the fourth secondary valve passage is connected to an inlet of the jet.

6. The multi-way valve of claim 5, wherein the secondary valve comprises a fifth valve position, wherein when the secondary valve is at the fifth valve position, the first secondary valve passage is connected to the fifth secondary valve passage, and the second secondary valve passage is connected to the third secondary valve passage.

7. The multi-way valve of claim 5, wherein the secondary valve comprises a sixth valve position and the secondary valve core comprises a secondary valve core passage; wherein when the secondary valve is at the sixth valve position, the first secondary valve passage is connected to the second secondary valve passage, and the third secondary valve passage is connected to the fifth secondary valve passage through the secondary valve core passage.

8. The multi-way valve of claim 1, wherein the secondary valve comprises a closing valve position, wherein when the secondary valve is at the closing valve position, the passages between the secondary valve passages are closed.

9. The multi-way valve of claim 1, wherein the main valve further comprises a main valve driving device connected to the main valve body and configured to drive the main valve core to move in the first inner chamber; and the secondary valve further comprises a secondary valve driving device connected to the secondary valve and configured to drive the secondary valve core to move in the second inner chamber.

10. The multi-way valve of claim 1, wherein each of the main valve body and the secondary valve body comprises grilles; each of the main valve passages and the secondary valve passage is between adjacent grilles, and each of the main valve core and the secondary valve core comprises water-passing grooves; a valve position switch of the main valve and the secondary valve is achieved through corresponding matching of the water-pass grooves and the grilles.

11. A water softener characterized by comprising a first resin tank, a second resin tank, a control unit, and a multi-way valve comprising a main valve and a secondary valve,
  wherein the main valve comprising: a main valve body comprising a first inner chamber, wherein the main valve body is provided with main valve passages connected to the first inner chamber, the main valve passages comprising a water inlet passage, a water outlet passage, a first main valve passage, and a second main valve passage; and a main valve core provided in the first inner chamber, wherein the main valve core moves in the first inner chamber to open or close passages between the main valve passages to realize a valve position switch of the main valve;
  wherein the secondary valve comprises: a secondary valve body comprising a second inner chamber, wherein the secondary valve body is provided with secondary valve passages connected to the second inner chamber, the secondary valve passage comprising a first secondary valve passage connected to the first main valve passage and a second secondary valve passage connected to the second main valve passage; and a secondary valve core provided in the second inner chamber, the secondary valve core moving in the second inner chamber to open or close passages between the secondary valve passages to realize a valve position switch of the secondary valve;
  wherein each of the main valve and the secondary valve comprises a bypass valve position, when each of the main valve and the secondary valve is at the bypass valve position, the water inlet passage, the first main valve passage, the first secondary valve passage, the second secondary valve passage, the second main valve passage, and the water outlet passage are sequentially connected;

wherein a resin chamber of the first resin tank is connected to the third main valve passage of the multi-way valve, and a central pipe of the first resin tank is connected to the fourth main valve passage of the multi-way valve;

a resin chamber of the second resin tank is connected to the fifth main valve passage of the multi-way valve, and a central pipe of the second resin tank is connected to the sixth main valve passage of the multi-way valve; and the control unit controls a valve position switch of the multi-way valve.

12. The water softener of claim 11, comprising:

a flow quantity detection device provided on the multi-way valve and configured to detect cumulative flow quantity of soft water of the first resin tank and the second resin tank;

wherein the control unit receives a flow quantity signal of the flow quantity detection device, and controls the valve position switch of the multi-way valve according to the flow quantity signal to change working states of the first resin tank and/or the second resin tank.

13. The water softener of claim 11, comprising:

a salt tank inside which the first resin tank, the second resin tank, and the multi-way valve are provided; and a salt level detection device provided inside the salt tank and configured to detect a salt level in the salt tank;

wherein the control unit receives a salt level signal of the salt level detection device and issues an alarm when the salt level is lower than a threshold value.

14. The water softener of claim 11, comprising: a water leakage alarm device connected to the control unit, wherein the water leakage alarm device transmits a water leakage signal to the control unit when the water leakage alarm device detects water leakage, and the control unit controls the multi-way valve to close.

15. The water softener of claim 11, comprising: a water mixing device connected between the water inlet passage and the water outlet passage, the water mixing device being controlled by the control unit.

16. A method for controlling a water softener, wherein the water softener comprises a first resin tank, a second resin tank, a control unit, and a multi-way valve comprising a main valve and a secondary valve, wherein the main valve comprising: a main valve body comprising a first inner chamber, wherein the main valve body is provided with main valve passages connected to the first inner chamber, the main valve passages comprising a water inlet passage, a water outlet passage, a first main valve passage, and a second main valve passage; and a main valve core provided in the first inner chamber, wherein the main valve core moves in the first inner chamber to open or close passages between the main valve passages to realize a valve position switch of the main valve;

wherein the secondary valve comprises: a secondary valve body comprising a second inner chamber, wherein the secondary valve body is provided with secondary valve passages connected to the second inner chamber, the secondary valve passage comprising a first secondary valve passage connected to the first main valve passage and a second secondary valve passage connected to the second main valve passage; and a secondary valve core provided in the second inner chamber, the secondary valve core moving in the second inner chamber to open or close passages between the secondary valve passages to realize a valve position switch of the secondary valve;

wherein each of the main valve and the secondary valve comprises a bypass valve position, when each of the main valve and the secondary valve is at the bypass valve position, the water inlet passage, the first main valve passage, the first secondary valve passage, the second secondary valve passage, the second main valve passage, and the water outlet passage are sequentially connected;

wherein a resin chamber of the first resin tank is connected to the third main valve passage of the multi-way valve, and a central pipe of the first resin tank is connected to the fourth main valve passage of the multi-way valve;

a resin chamber of the second resin tank is connected to the fifth main valve passage of the multi-way valve, and a central pipe of the second resin tank is connected to the sixth main valve passage of the multi-way valve; and the control unit controls a valve position switch of the multi-way valve wherein the method comprises:

taking the first resin tank as a working tank and taking the second resin tank as a standby tank, or taking the first resin tank as the standby tank and taking the second resin tank as the working tank; and comparing cumulative flow quantity of soft water of the working tank and a preset value, and when the cumulative flow quantity of soft water reaches the preset value, controlling the multi-way valve to switch the working tank and the standby tank.

17. The method for controlling the water softener of claim 16, comprising: making the main valve and the secondary valve enter a bypass state through controlling the multi-way valve, and supplying water that has not been softened through the water softener.

* * * * *